United States Patent
Klockar

(10) Patent No.: US 12,504,373 B2
(45) Date of Patent: Dec. 23, 2025

(54) OPTICAL MEASUREMENT DEVICE

(71) Applicant: Insplorion Sensor Systems AB, Gothenburg (SE)

(72) Inventor: Per Klockar, Torslanda (SE)

(73) Assignee: INSPLORION SENSOR SYSTEMS AB, Gothenburg (SE)

( * ) Notice: Subject to any disclaimer, the term of this patent is extended or adjusted under 35 U.S.C. 154(b) by 11 days.

(21) Appl. No.: 18/251,471

(22) PCT Filed: Nov. 3, 2021

(86) PCT No.: PCT/EP2021/080554
§ 371 (c)(1),
(2) Date: May 2, 2023

(87) PCT Pub. No.: WO2022/096532
PCT Pub. Date: May 12, 2022

(65) Prior Publication Data
US 2024/0019368 A1 Jan. 18, 2024

(30) Foreign Application Priority Data
Nov. 3, 2020 (EP) .................................. 20205477

(51) Int. Cl.
*G01N 21/552* (2014.01)
(52) U.S. Cl.
CPC . *G01N 21/554* (2013.01); *G01N 2201/06106* (2013.01); *G01N 2201/06153* (2013.01)
(58) Field of Classification Search
CPC ............ G01B 9/02051; G01B 9/02083; G01B 2290/55; G06N 10/40; B82Y 20/00
See application file for complete search history.

(56) References Cited

U.S. PATENT DOCUMENTS

2002/0005953 A1* 1/2002 Negami ............... G01N 21/553
356/445
2006/0158653 A1* 7/2006 Chiarello ............. G01N 21/553
356/445

(Continued)

FOREIGN PATENT DOCUMENTS

EP 2264438 A1 12/2010
JP H08-043448 2/1996

(Continued)

OTHER PUBLICATIONS

Suzuki, Akihiro et al. "Development of Novel Optical Waveguide Surface Plasmon Resonance (SPR) Sensor with Dual Light Emitting Diodes." Sensors and actuators. B, Chemical 106.1 (2005): 383-387 (Year: 2005).*

(Continued)

*Primary Examiner* — Georgia Y Epps
*Assistant Examiner* — Monica T Taba
(74) *Attorney, Agent, or Firm* — Shih IP Law Group, PLLC

(57) ABSTRACT

The present invention relates to a method and device for determining a property of an ambient environment. The device comprises a plasmonic sensing element; a first light source for illuminating a first and a second light sensor, the first sensor via the plasmonic sensing element; a second light source for illuminating the light sensors; circuitry for executing: a control function controlling light sources, a function receiving a measurement from the first sensor, and a first signal from the second sensor, a function receiving a reference from the first sensor, and a second signal from the second sensor, a function determining the property by comparing the measurement and reference signals, and the control function further controlling light sources such that a (Continued)

relation of intensities of light emitted by the light sources is constant over time.

16 Claims, 10 Drawing Sheets

(56) References Cited

U.S. PATENT DOCUMENTS

2012/0133943 A1* 5/2012 Fontaine .............. G01N 21/553
  356/445
2016/0169797 A1 6/2016 Chau

FOREIGN PATENT DOCUMENTS

JP     H09-257699     10/1997
JP     2002340790 A * 11/2002

OTHER PUBLICATIONS

Zybin A., et al "Double-wavelength technique for surface plasom resonance measurements: Basic concept and applications for single sensors and two-dimensional sensor arrays", Analytical Chemistry, American Chemical Society, vol. 77, No. 8, Apr. 15, 2005, pp. 2393-2399, XP002613071, ISSN: 0003-2700, DOI: 10.1021/AC048156V [retrieved on Mar. 15, 2005] figures 2, 3, 9-11 and the corresponding description abstract.

International Search Report from International Application No. PCT/EP2021/080554, mailed date Jan. 10, 2022.

* cited by examiner

OPTICAL MEASUREMENT DEVICE

TECHNICAL FIELD

The present inventive concept relates to a method and an optical measurement device for determining a property of an ambient environment.

BACKGROUND OF THE INVENTION

Optical sensors are useful in a wide range of applications. A typical optical sensor is constructed to convert a physical, chemical, physio-chemical, or other property into an electrical signal by means of optical readout. Typically, in optical sensors the intensity or spectrum of light transmitted through, or reflected from, a sensing section of the optical sensor is detected. In such optical sensors it is thus important to accurately measure the intensity or spectrum of light. Put differently, a change in the detected light is a measure of the effect in the sensing section.

In some optical sensors, the sensing section consists of a metal-like thin film, particle, or assembly of particles. Such a sensing section can be capable of supporting travelling electromagnetic waves, usually referred to as surface plasmon polaritons, at an interface between the thin film or particles and the ambient environment. The surface plasmon polaritons can be either propagating, as is the case for a continuous film, or localized, as is the case for particles. In either case, the properties and behaviour (e.g. excitation frequency and dampening) of the surface plasmon polaritons depends, among other things, on the properties of the ambient environment.

An important characteristic for sensors in general is the importance of protecting, preventing, and isolating the output signal from any perturbation that can inadvertently affect the signal, give rise to noise, false signals, or reduced performance, etc. In the field of optical sensors such perturbations of the optical sensor typically include temperature, humidity, ambient light conditions, air pollution, and other external factors that has an unwanted influence on the output signal.

Common light sources used for optical measurements are lasers. Lasers have many desirable properties, in particular related to stability of the emitted light. For example, light emitted by a laser may be stable in intensity and wavelength. Put differently, light emitted by a laser may have an essentially non-varying intensity and wavelength. However, such lasers are typically expensive and may have a large footprint (i.e. needing a large amount of space), which may be inappropriate for small optical sensors.

As such, there is a demand for improvement in optical sensors where the accuracy, stability and robustness are uncompromised, yet implemented in a cost-effective manner.

SUMMARY OF THE INVENTION

In view of the above, it is an object of the present inventive concept to provide a robust optical measurement device.

It is a further object of the present inventive concept to provide an optical measurement device for which an effect of long-term drift of components is reduced.

It is a further object of the present inventive concept to provide an optical measurement device for which influence on the performance of the optical measurement device by external factors is reduced.

It is an object to, at least partly, mitigate, alleviate, or eliminate one or more of the above-identified deficiencies in the art and disadvantages singly or in any combination and solve at least the above-mentioned problem.

According to a first aspect an optical measurement device for determining a property of an ambient environment is provided. The optical measurement device comprising: a plasmonic sensing element configured to, when illuminated with electromagnetic radiation, exhibit a plasmonic resonance condition being dependent on the property of the ambient environment; a first light sensor; a second light sensor; a first light source arranged to simultaneously illuminate the first light sensor and the second light sensor, wherein the first light sensor is illuminated by the first light source via the plasmonic sensing element; a second light source arranged to simultaneously illuminate the first light sensor and the second light sensor; and circuitry configured to execute: a control function configured to control the first light source and the second light source to alternately illuminate the first and second light sensors, a first receive function configured to receive a measurement signal from the first light sensor pertaining to light emitted by the first light source, and a first source signal from the second light sensor pertaining to light emitted by the first light source, a second receive function configured to receive a reference signal from the first light sensor pertaining to light emitted by the second light source, and a second source signal from the second light sensor pertaining to light emitted by the second light source, and a determination function configured to determine the property of the ambient environment by comparing the measurement signal and the reference signal, and the control function being further configured to control the first light source and the second light source, using the first source signal and the second source signal, such that a relation of the intensities of light emitted by the first light source and the second light source is constant over time.

Within the context of this disclosure, the wording "plasmonic sensing element" should be construed as a sensing element in which plasmons may be excited. Plasmons should here be understood as quanta of plasma oscillations associated with a collective oscillation of charge density. The charges may, e.g., be provided by electrons.

Within the context of this disclosure, the wording "ambient environment" should be construed as the environment in the close vicinity of the plasmonic sensing element. Put differently, the ambient environment is the environment affecting the plasmonic resonance condition of the plasmonic sensing element.

The present inventive concept allows compensating for intrinsic properties and/or behaviour of components of the optical measurement device, thereby allowing a robust and stable readout of the optical measurement device. This may, in turn, allow the optical measurement device to accurately determine the property of the ambient environment. The present inventive concept may further allow compensation for influence of external factors, e.g. one or more of humidity, temperature, pressure, and ambient light, that may affect different components to different extents, which may thereby affect the determination of the property of the ambient environment. Put differently, the present inventive concept may, on the one hand, improve the stability of the optical measurement device, and, on the other hand, reduce influence on the performance of the optical measurement device by external factors.

The plasmonic resonance condition may be a surface plasmon resonance condition and/or a localized surface plasmon resonance condition.

The wordings "surface plasmon resonance condition", SPR, and "localized surface plasmon resonance condition", LSPR, are to be understood as excited states of charge carriers within the plasmonic sensing element, which can be excited by photons or, equivalently, by the electromagnetic field of light incident on the plasmonic sensing element.

A possible associated advantage is that an optical measurement device with an improved sensitivity may be allowed. For example, the property of the ambient environment may be determined using a relatively small sample size.

The SPR condition is a resonance condition associated with a collective oscillation of charge density and to the boundary conditions at a surface of the plasmonic sensing element. A charge density wave may form and propagate at a surface boundary between the plasmonic sensing element and the ambient environment surrounding the plasmonic sensing element. The SPR may occur when an incident electromagnetic wave fulfils a resonance condition of the plasmonic sensing element. Put differently, when energy and momentum (i.e. the wavevector) of an incident electromagnetic wave matches the energy and wavevector of a surface plasmon, the SPR condition may be fulfilled. For example, the SPR typically occurs in the visible part and/or in the near infrared part of the electromagnetic spectrum. A frequency/wavelength/energy of the charge density wave may be set by electronic properties of a material of the plasmonic sensing element and material properties of the ambient environment surrounding the plasmonic sensing element. It should be understood that SPR may occur when electromagnetic radiation (i.e. light) interacts with the plasmonic sensing element.

The LSPR condition is a resonance condition associated with a collective oscillation of charge density and to the boundary conditions resulting from the finite size of the plasmonic sensing element. As a result, a charge density wave is formed with a frequency/wavelength/energy that is set by the electronic properties of the material of the plasmonic sensing element, its geometry, size and the material properties of the ambient environment surrounding the plasmonic sensing element. As an example, the LSPR typically occurs in the visible part of the electromagnetic wavelength spectrum if the plasmonic sensing element is a gold particle having a diameter in the range of 50-100 nm. It should further be understood that the LSPR occurs when the electromagnetic radiation interacts with the plasmonic sensing element. As a result, an enhanced local electromagnetic field is created in the close vicinity of the plasmonic sensing element. The strength of the enhancement and the spatial extent of the enhanced field depend on a number of parameters such as the material, size, shape, and environment of the plasmonic sensing element. The enhanced electric field is beneficial as it improves the sensitivity of the plasmonic sensing element such that a more efficient sensing of the property of the ambient environment is provided.

The control function may be configured to control the first light source and the second light source to alternately illuminate the first and second light sensors at a frequency of ≥0.5 Hz. Put differently, at a first point in time, the first light source may simultaneously illuminate the first and second light sensors, and at a second point in time, the second light source may simultaneously illuminate the first and second light sensors. The first point in time and the second point in time may be separated by a time period being a reciprocal of the frequency at which the first and second light sources alternately illuminate the first and second light sensors.

A possible associated advantage is that influences (e.g. external factors, intrinsic properties and/or behavior of components of the optical measurement device) that affect the optical measurement device at a frequency lower than the frequency with which the light sources are illuminated may be reduced. In this way, an effect of long-term drift of one or more electrical and/or optical components may be reduced.

The determination function may be configured to determine the property of the ambient environment by being configured to determine a ratio of the measurement signal and the reference signal.

The relation of the intensities of light emitted by the first light source and the second light source may be that the intensities are equal.

A possible associated advantage is that the components of the optical measurement device, in particular the first and second light sensors, may behave in the same or a similar manner when illuminated by equal or similar intensities.

A further possible associated advantage is that the intensity of light illuminating the second light sensor may be similar when it is illuminated by light from the first light source and light from the second light source. An improved control of the intensity of light emitted from the first light source and the second light source may thereby be allowed.

The optical measurement device may further comprise: a housing of an opaque material; and wherein the housing may comprise channels arranged to allow for optical communication between the first light source and the first and second light sensors, and between the second light source and the first and second light sensors.

A possible associated advantage is that the first and second light sources may be protected by being surrounded by the housing.

A further possible associated advantage is that the first and second light sensors may be protected by being surrounded by the housing.

A further possible associated advantage is that objects that inadvertently block light emitted from a light source may be prohibited from entering the channels. Hence, a more robust and/or reliable optical measurement device may be allowed.

A further possible associated advantage is that the housing may prevent influence of ambient and/or stray light.

A further possible associated advantage is that the channels may be filled or partially filled with a material that may promote or influence the optical communication between one or more of the light sources, the light sensors, and the plasmonic sensing element. For example, the material may be glass, a gas and/or a liquid.

The optical measurement device may further comprise: a plurality of optical fibers; and wherein the plurality of optical fibers may be arranged to allow for optical communication between first light source and the first and second light sensors, and/or between the second light source and the first and second light sensors.

A possible associated advantage is that the plasmonic sensing element may be remotely positioned from one or more of the other components of the optical measurement device (e.g., the housing, if present). Hence, the optical measurement device may thereby be allowed to sample/perform measurements in constricted spaces.

A further possible associated advantage is that components other than the plasmonic sensing element may be arranged in a more favorable environment (i.e. an environment less influenced by the ambient environment), thereby enhancing the performance of the optical measurement device since an effect of changes in the property of the ambient environment on the components is reduced.

The optical measurement device may further comprise: a further plasmonic sensing element configured to, when illuminated with electromagnetic radiation, exhibit a plasmonic resonance condition being dependent on a further property of the ambient environment; a third light sensor; and a third light source arranged to simultaneously illuminate the second light sensor and the third light sensor, wherein the third light sensor may be illuminated by the third light source via the further plasmonic sensing element; wherein the second light source may be further arranged to simultaneously illuminate the second light sensor and the third light sensor; wherein the control function may be further configured to control the second light source and the third light source to alternately illuminate the second and third light sensors; wherein the circuitry may be further configured to execute a further receive function configured to receive a further measurement signal from the third light sensor pertaining to light emitted by the third light source, and a further source signal from the second light sensor pertaining to light emitted by the third light source; wherein the determination function may be further configured to determine the further property of the ambient environment by comparing the further measurement signal and the reference signal; and wherein the control function may be further configured to control the third light source, using the second source signal and the further source signal, such that a relation of the intensities of light emitted by the second light source and the third light source is constant over time.

A possible associated advantage is that the optical measurement device may be allowed to sample different portions of the ambient environment. Hence, the optical measurement device may thereby determine a more complete picture of the ambient environment since more than one property of the ambient environment may be determined. Further, in case the property and the further property are the same, the optical measurement device may be allowed to determine how the property of the ambient environment varies spatially by arranging the plasmonic sensing element and the further plasmonic sensing element at spatially different locations in the ambient environment. Further, using more than one plasmonic sensing element may allow for measurements of more than one ambient environment.

The optical measurement device may further comprise: a plurality of plasmonic sensing elements, wherein said plasmonic sensing element is a plasmonic sensing element of the plurality of plasmonic sensing elements; and an optical switch arranged to receive light from the first light source and to illuminate the first light sensor via at least one plasmonic sensing element of the plurality of plasmonic sensing elements.

Hence, the optical measurement device may comprise one or more plasmonic sensing elements, and the optical switch may be used to select via which of the one or more plasmonic sensing elements that the first light sensor is illuminated. It may further be possible to simultaneously select a plurality of plasmonic sensing elements via which the first light sensor is illuminated (i.e. the first light sensor is illuminated via more than one plasmonic sensing element). For example, by selecting a plurality of plasmonic sensing elements that react similarly to changes in the property of the ambient environment, the optical measurement device may be more sensitive to changes in the property of the ambient environment. Further, by selecting a plurality of plasmonic sensing elements that react differently to changes in the property of the ambient environment (e.g. by being sensitive to different properties of the ambient environment), the optical measurement device may perform multiplexed measurements of the ambient environment.

A possible associated advantage is that the optical measurement device may be allowed to sample different portions of the ambient environment. Hence, the optical measurement device may thereby determine the property of the ambient environment with a higher accuracy. Further, the optical measurement device may be allowed to determine how the property of the ambient environment varies spatially. Further, using a plurality of plasmonic sensing elements may allow for measurements of a plurality of ambient environments. For example, a plurality of batteries, a plurality of exhaust streams and/or a plurality of liquids.

The first light source and/or the second light source may be a light emitting diode.

A possible associated advantage is that the first and/or second light source may be small and energy efficient. A further possible associated advantage is that the first and/or second light source may be less expensive than other suitable light sources (e.g. lasers).

The third light source may be a light emitting diode.

A possible associated advantage is that the third light source may be small and energy efficient. A further possible associated advantage is that the third light source may be less expensive than other suitable light sources (e.g. lasers).

According to a second aspect a method for determining a property of an ambient environment is provided. The method comprising: illuminating, by a first light source, a second light sensor; receiving, from the second light sensor, a first source signal pertaining to light emitted from the first light source; illuminating, by a second light source, the second light sensor; receiving, from the second light sensor, a second source signal pertaining to light emitted from the second light source from the second light sensor; controlling the first light source and the second light source using the first source signal and the second source signal such that a relation of intensities of light emitted by the first light source and the second light source is constant over time; illuminating, by the first light source, the first light sensor via a plasmonic sensing element, wherein the plasmonic sensing element, when illuminated with electromagnetic radiation, exhibits a plasmonic resonance condition being dependent on the property of the ambient environment; receiving, from the first light sensor, a measurement signal pertaining to light emitted from the first light source; illuminating, by the second light source, the first light sensor; receiving, from the first light sensor, a reference signal pertaining to light emitted from the second light source; and determining the property of the ambient environment by comparing the measurement signal and the reference signal.

The above-mentioned features of the first aspect, when applicable, apply to this second aspect as well. In order to avoid undue repetition, reference is made to the above.

The first light source may illuminate the first light sensor and the second light sensor simultaneously and/or the second light source may illuminate the first light sensor and the second light sensor simultaneously.

The first light source and the second light source may alternately illuminate the first light sensor and/or the second light sensor.

The first light source and the second light source may alternately illuminate the first light sensor and/or the second light sensor at a frequency 0.5 Hz.

One of the measurement signal and the reference signal may be received at a first point in time, and the other of the measurement signal and the reference signal may be received at a second point in time, wherein the first point in time and the second point in time may be separated by a time period based on the frequency at which the first light source and the second light source alternately may illuminate the first light sensor and/or the second light sensor.

According to a third aspect a non-transitory computer-readable storage medium is provided. The non-transitory computer-readable storage medium comprises program code portions which, when executed on a device having processing capabilities, performs the method according to the second aspect.

The above-mentioned features of the first aspect and/or the second aspect, when applicable, apply to this third aspect as well. In order to avoid undue repetition, reference is made to the above.

A further scope of applicability of the present disclosure will become apparent from the detailed description given below. However, it should be understood that the detailed description and specific examples, while indicating preferred variants of the present inventive concept, are given by way of illustration only, since various changes and modifications within the scope of the inventive concept will become apparent to those skilled in the art from this detailed description.

Hence, it is to be understood that this inventive concept is not limited to the particular steps of the methods described or component parts of the systems described as such method and system may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects of the present inventive concept will now be described in more detail, with reference to appended drawings showing variants of the inventive concept. The figures should not be considered limiting the inventive concept to the specific variant; instead they are used for explaining and understanding the inventive concept. As illustrated in the figures, the sizes of layers and regions are exaggerated for illustrative purposes and, thus, are provided to illustrate the general structures of variants of the present inventive concept. Like reference numerals refer to like elements throughout.

DETAILED DESCRIPTION

The present inventive concept will now be described more fully hereinafter with reference to the accompanying drawings, in which currently preferred variants of the inventive concept are shown. This inventive concept may, however, be implemented in many different forms and should not be construed as limited to the variants set forth herein; rather, these variants are provided for thoroughness and completeness, and fully convey the scope of the present inventive concept to the skilled person.

It is to be understood that electrical connections between components, even though not explicitly described as such, may be implemented in a range of different manners. For example, electrical connections may be implemented using electrical conducting cables. As a further example, electrical connections may be implemented using a printed circuit board. Hence, it is to be understood that the optical measurement device may comprise means for electrical connections (e.g. electrical conductors, printed circuit boards, etc.) even though not explicitly illustrated in the figures.

Figure 1:
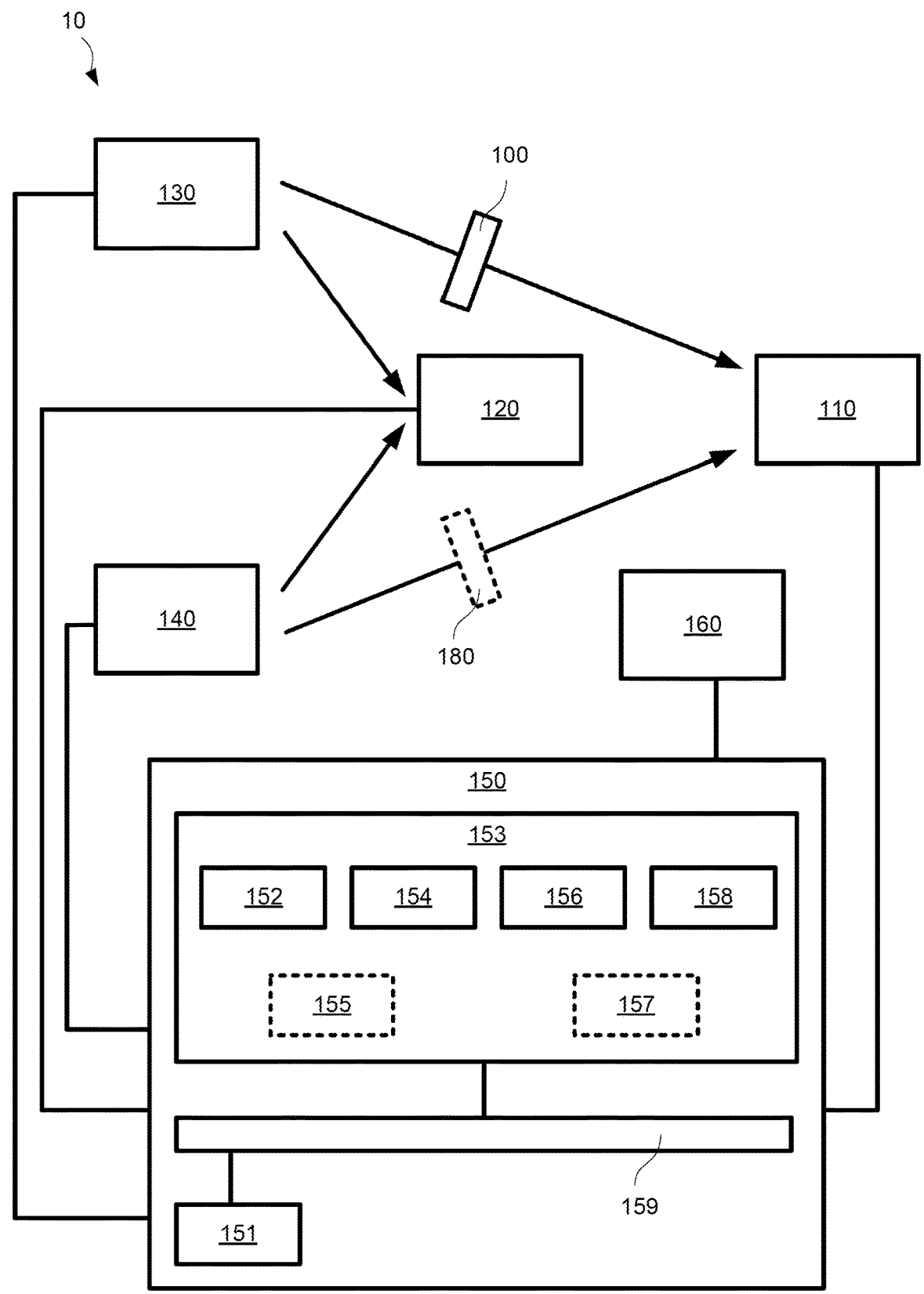
FIG. 1 illustrates an optical measurement device.
Figure 6:
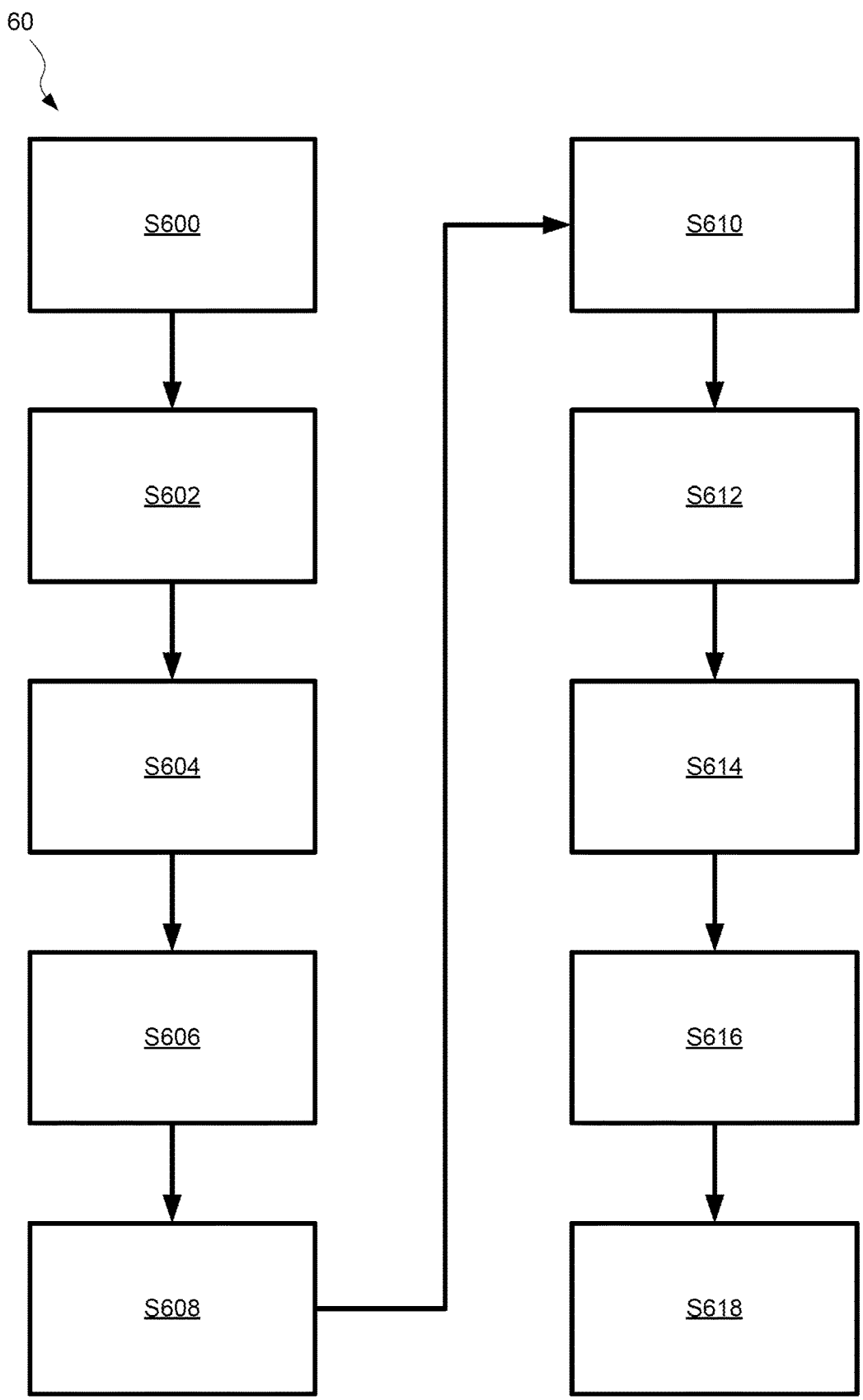
FIG. 6 is a block scheme of a method for determining a property of an ambient environment.

FIG. 1 illustrates a schematic of an optical measurement device 10 for determining a property of an ambient environment. The property may be an optical property of the ambient environment. The optical property may be a dielectric function of the ambient environment. The optical property may be a refractive index of the ambient environment. The optical measurement device 10 may be designed to measure a range of different properties. For example, it may be designed to detect specific gases (e.g., $H_2$, $NO_2$, etc.) in the vicinity of the optical measurement device 10. Alternatively, or additionally, the optical measurement device 10 may be designed to determine properties of a liquid. In a specific example, a status of a battery may be determined by the optical measurement device 10 by exposing the optical measurement device 10 to an electrolyte of the battery. The status of the battery may, e.g., be a charge status and/or a health status of the battery. The functions of the optical measurement device 10 will be described in the following with further reference to the block scheme illustrated in FIG. 6.

As is illustrated in FIG. 1, the optical measurement device 10 comprises a plasmonic sensing element 100, a first light sensor 110, a second light sensor 120, a first light source 130, a second light source 140, and circuitry 150. The optical measurement device 10 may further comprise additional optical components, such as lenses, filters, and/or beam splitters.

The plasmonic sensing element 100 is configured to, when illuminated with electromagnetic radiation, exhibit a plasmonic resonance condition being dependent on the property of the ambient environment. The plasmonic resonance condition may be a surface plasmon resonance condition and/or a localized surface plasmon resonance condition. The plasmonic sensing element 100 may be associated with a sensing volume. The sensing volume may be a volume defined by the spatial extension of an electromagnetic field from the excited plasmonic resonance. It is to be understood that electromagnetic radiation, which is pertaining to the sensing volume provides information about the ambient environment within the sensing volume. Since the spatial extension of this electromagnetic field depends both on details of the plasmonic sensing element 100, on properties of the ambient environment surrounding the plasmonic sensing element 100 and on the direction of the incident electromagnetic field in relation to the geometry of the plasmonic sensing element 100, the volume of the sensing volume depends on all these parameters. To this end, the electromagnetic field related to the excited plasmonic resonance falls of gradually, often approximately exponentially, away from the plasmonic sensing element 100 such that the sensing volume typically has an extension on the length scale of several hundred nanometers, e.g. 100-500 nm, for SPR and several ten nanometers, e.g. 10-100 nm, for LSPR. Hence, it is to be understood that the optical measurement device 10 of the present inventive concept may be designed to determine a wide range of properties of the ambient environment, provided that the property of interest affects a plasmonic resonance condition of the plasmonic element of the optical measurement device 10. In practice, the plasmonic sensing element 100 is designed to specifically react to changes in the property of the ambient environment, whereas the other components of the optical measurement device 10 are not. A layer may be deposited on a surface of the plasmonic sensing element 100, and the deposited layer may be configured to interact with the ambient environment. The layer may comprise a material different from the material of the plasmonic sensing element 100. The layer may be a dielectric material, e.g. a metal oxide.

The first light sensor 110 and/or the second light sensor 120 may generate a signal which is dependent on the intensity of light incident on respective light sensor. There are a range of different sensors/components with this behavior, for example photodiodes. The signal may be further dependent on a wavelength of the light incident on the light sensor. Hence, the specific type of light sensors 110, 120 may be chosen taking the wavelength/wavelengths light emitted by light sources 130, 140 into account. Put differently, the specific types of light sensors 110, 120 and light sources 130, 140 may be chosen such that they are suitable to work together.

As is illustrated in FIG. 1, the first light source 130 is arranged to simultaneously illuminate S600, S610 the first light sensor 110 and the second light sensor 120. This may be facilitated using optical components, e.g. beam splitters, mirrors, optical fibers, splitters, etc. It is to be understood that the optical measurement device 10 may comprise such components, even though they are not explicitly illustrated in the figures. It may additionally, or alternatively, be facilitated by positioning the first light source 130 such that a first portion of the light emitted by the first light source 130 may reach the first light sensor 110 and a second portion of the light emitted by the first light source 130 may reach the second light sensor 120. The first light source 130 may be a light emitting diode. The first light sensor 110 is illuminated S610 by the first light source 130 via the plasmonic sensing element 100. The second light sensor 120 may be illuminated by the first light source 130 without passing optical components that are configured to specifically react to the ambient environment, e.g. direct illumination. It is to be understood that optical components may be affected by the ambient environment (e.g., by temperature changes etc.), without being specifically configured to do so. In this case, mirrors and other optical components that might be needed to allow the second light sensor 120 to be illuminated by the first light source 130 are not to be seen as being configured to react to the ambient environment, even if they happen to do so to a small degree. Put differently, the degree to which these components react to changes in the property of the ambient environment should be compared to the degree to which the plasmonic sensing element 100 reacts to changes in the property of the ambient environment. In such a comparison, the degree to which these components react to changes in the property of the ambient environment is smaller than the degree to which the plasmonic sensing element 100 reacts to changes in the property of the ambient environment.

As is illustrated in FIG. 1, the second light source 140 is arranged to simultaneously illuminate S604, S614 the first light sensor 110 and the second light sensor 120. Similar to the first light source 130, the second light source 140 may be arranged to illuminate the first and second light sensors 110, 120 by using optical components. It may additionally, or alternatively, be facilitated by positioning the second light source 140 such that a first portion of the light emitted by the second light source 140 may reach the first light sensor 110 and a second portion of the light emitted by the second light source 140 may reach the second light sensor 120. The second light source 140 may be a light emitting diode. The first and/or second light sensors 110, 120 may be illuminated by the second light source 140 without passing optical components that are configured to specifically react to the ambient environment, e.g. direct illumination. Similarly to what is disclosed above, the optical components may be affected by the ambient environment, without being specifically configured to do so. In this case, mirrors and other optical components that might be needed to allow the first light sensor 110 and/or second light sensor 120 to be illuminated by the second light source 140 are not to be seen as being configured to react to the ambient environment, even if they happen to do so to a small degree. Put differently, the degree to which these components react to the ambient environment should be compared to the degree to which the plasmonic sensing element 100 reacts to the ambient environment. In such a comparison, the degree to which these components react to the ambient environment is smaller than the degree to which the plasmonic sensing element 100 reacts to the ambient environment.

Further, the first light sensor 110 may be illuminated by the second light source 140 via a filter (not shown) configured to reduce an intensity of light incident on the filter. The filter may be a transmission filter configured to reduce intensity of light transmitted through the filter. The filter may be a reflective filter configured to reduce intensity of light reflected by the filter. The filter may, e.g., be a neutral density filter. This may be advantageous since the intensity of light emitted by the second light source 140 and incident on the first light sensor 110 may be similar to an intensity of light emitted by the first light source 130 and incident on the first light sensor 110. Put differently, the filter may allow the intensity of light incident on the first light sensor 110 to be similar regardless if the light is emitted by the first light source 130 or the second light source 140. This, in turn, may reduce a risk of the first light sensor 110 to be saturated with light from the second light source 140, which is a risk in case the plasmonic sensing element 100 attenuates light to a large degree.

The circuitry 150 is configured to execute a control function 152, a first receive function 154, a second receive function 156, and a determination function 158. The first receive function 154 and the second receive function 156 may be implemented as a single receive function. The circuitry 150 may be configured to carry out overall control of functions and operations of the optical measurement device 10. The circuitry 150 may comprise a processing unit 151. The processing unit 151 may be one or more of a processor, a central processing unit, a microcontroller, and a microprocessor. The circuitry 150 may further comprise a memory 153. As illustrated in FIG. 1, the memory 153 may be configured to store one or more of the functions 152, 154, 156, 158 that the circuitry 150 is configured to execute. The memory 153 may be a non-transitory computer-readable storage medium. The memory 153 may be one or more of a buffer, a flash memory, a hard drive, a removable medium, a volatile memory, a non-volatile memory, a random-access memory RAM, or another suitable device. In a typical arrangement, the memory 153 may include a non-volatile memory for long term data storage and a volatile memory that functions as system memory for the circuitry 150. As illustrated in the example of FIG. 1, the memory 153 may exchange data with the circuitry 150 over a data bus 159. Further, communication between components of the optical measurement device 10 may be via the data bus 159. Accompanying control lines and an address bus between the memory 153 and the circuitry 150 may further be present. Functions and operations of the optical measurement device 10 may be implemented in the form of executable logic routines (e.g., lines of code, software programs, etc.) that are stored on a non-transitory computer-readable medium (e.g., the memory 153) of the optical measurement device 10 and are executed by the circuitry 150 (e.g., using the processing unit 151). Furthermore, the functions and operations of the optical measurement device 10 may be a stand-alone software application or form a part of a software application that carries out additional tasks related to the optical measurement device 10. The described functions and operations may be considered a method that the corresponding device is configured to carry out. Also, while the described functions and operations may be implemented in software, such functionality may as well be carried out via dedicated hardware or firmware, or some combination of hardware, firmware, and/or software. The circuitry 150 may further comprise electrical components used to convert signals from the light sensors 110, 120. For instance, the circuitry 150 may comprise signal amplifiers and/or A/D converters. Such electrical components and their functions are well-known to the skilled person. Even though the circuitry 150 is schematically illustrated in FIG. 1 as a single component, it is to be understood that the circuitry 150 may be distributed. For example, the circuitry 150 and/or its functions may be distributed in different physical locations and/or devices.

Figure 2:
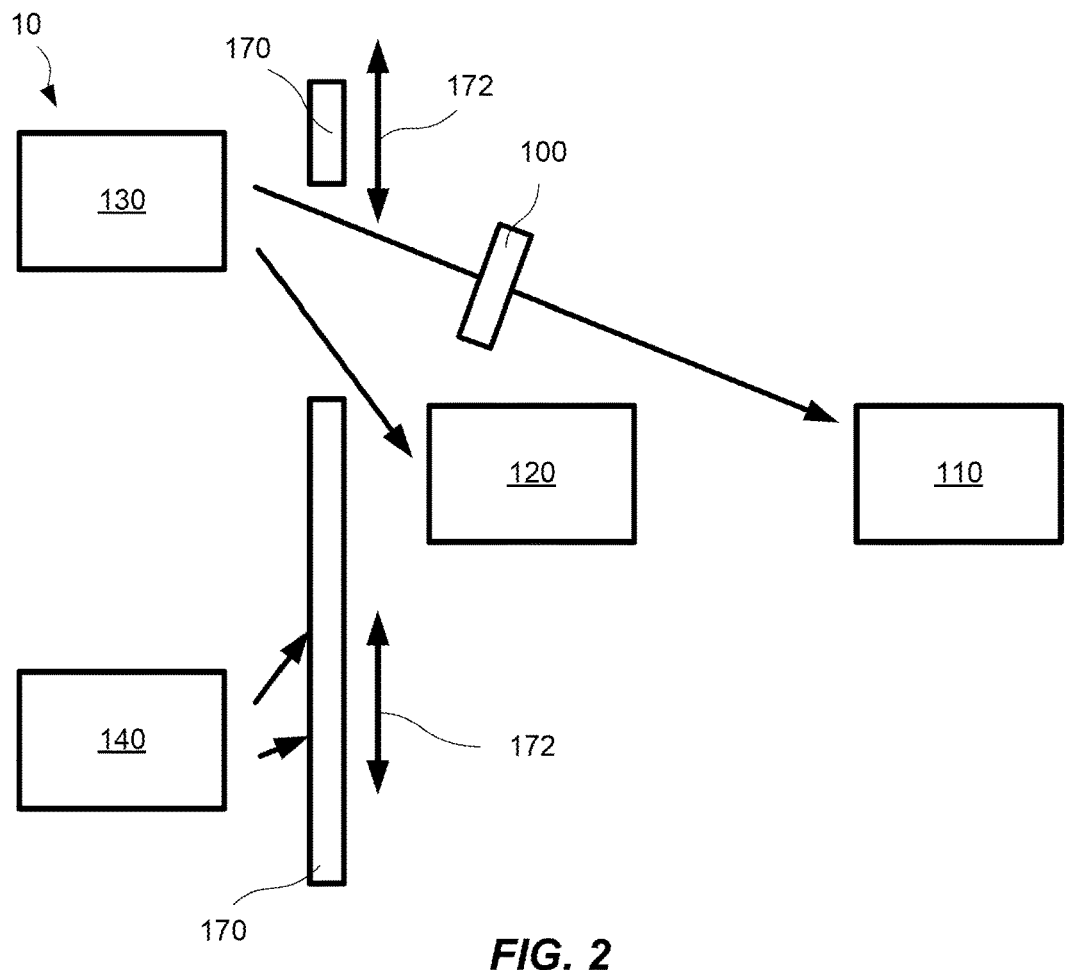
FIG. 2 illustrates an optical measurement device further comprising an adjustable aperture.

The control function 152 is configured to control the first light source 130 and the second light source 140 to alternately illuminate S600, S604, S610, S614 the first and second light sensors 110, 120. Put differently, at a first point in time, the first light source 130 simultaneously illuminates S600, S610 both of the first and second light sensors 110, 120, and at a second point in time, the second light source 140 simultaneously illuminates S604, S614 both of the first and second light sensors 110, 120. The control function 152 may be configured to control the first light source 130 and the second light source 140 to alternately emit light, thereby allowing the first light source 130 and the second light source 140 to alternately illuminate the first and second light sensors 110, 120. As is shown in the example of FIG. 2, the optical measurement device 10 may further comprise an adjustable aperture 170 arranged to adjustably block light emitted from the first light source 130 and the second light source 140, and the control function 152 may be configured to control the adjustable aperture 170. Thus, by controlling the adjustable aperture 170, light emitted from one of the light sources 130, 140 may be blocked, while light emitted from the other one of the light sources 130, 140 may reach the light sensors 110, 120. By controlling the adjustable aperture 170, the control function 152 may control the first light source 130 and the second light source 140 to alternately illuminate the first and second light sensors 110, 120. As is illustrated in FIG. 2, the adjustable aperture 170 may be a slidable element configured to be slidable along the directions indicated by double-arrow 172. Alternatively, or additionally, the adjustable aperture 170 may, e.g., be one or more of a chopper wheel, a mechanical shutter, and switchable glass (i.e. glass with adjustable light transmission). It is to be understood that the first light source 130 and the second light source 140 may alternately illuminate the first and second light sensors 110, 120 intermittently. Put differently, there may be time periods during which neither the first light source 130 nor the second light source 140 illuminates the first and second light sensors 110, 120. During this time, the circuitry 150 may be configured to execute a third receive function 157. The third receive function 157 may be configured to receive a first background signal from the first light sensor 110 and a second background signal from the second light sensor 120. One or more of the first receive function 154, the second receive function 156 and the third receive function may be implemented as a single receive function. The first background signal and/or the second background signal may be used to reduce a background of signals received by the first receive function 154 and/or the second receive function 156. The first background signal may be used to reduce the background of signals received from the first light sensor 110, and the second background signal may be used to reduce the background of signals received from the second light sensor 120. The circuitry 150 may be configured to execute a background reduction function 155 configured to reduce the background of received signals using the first background signal and/or the second background signal.

The control function 152 may be configured to control the first light source 130 and the second light source 140 to alternately illuminate S600, S604, S610, S614 the first and second light sensors 110, 120 at a frequency of 0.5 Hz. Hence, the first point in time (when the first light source 130 simultaneously illuminates the first and second light sensors 110, 120) and the second point in time (when the second light source 140 simultaneously illuminates the first and second light sensors 110, 120) may be separated by a time period which is a reciprocal of the frequency at which the first and second light sources 130, 140 alternately illuminate the first and second light sensors 110, 120. For example, in case the frequency is 10 Hz, the time period separating the first point in time from the second point in time is 0.1 s. It is to be understood that there may be delays (e.g., electronic delays, mechanical delays, time delays related to adjusting the adjustable aperture 170 or time delays for the light sources 130, 140 to start emitting light after being instructed to do so) associated with the alternating illumination, and the time period separating the first point in time from the second point in time may therefore be longer than the reciprocal of the frequency.

The first receive function 154 is configured to receive S612 a measurement signal from the first light sensor 110 pertaining to light emitted by the first light source 130. Since the first light source 130 illuminates the first light sensor 110 via the plasmonic sensing element 100, the measurement signal contains information relating to the ambient environment. This, since the plasmonic resonance condition allows the plasmonic sensing element 100 to interact with the ambient environment, and thereby affect the light incident on the plasmonic sensing element 100. How, and to what extent, the light is affected depends on the type of the plasmonic sensing element 100 and on the ambient environment in the vicinity of the plasmonic sensing element 100. The plasmonic sensing element 100 may comprise a metal. The metal may be one or more of Ag, Au, Cu, Al, Mg, Ni, Pd, Sn, Hf, Ru, Rh, Ir, and Cr. Which material (e.g., which one or ones of the listed metals) the plasmonic sensing element 100 comprises may be chosen depending on which property of the ambient environment the optical measurement device 10 is configured to determine. Further, the light incident on the plasmonic sensing element 100 may be attenuated by interacting with the plasmonic sensing element 100, and the extent to which the light is attenuated may, at least partly, depend on the ambient environment. The attenuation of light by the plasmonic sensing element 100 may be wavelength dependent. For example, which wavelength or wavelengths of light that are attenuated may depend on the details of the plasmonic sensing element 100 and its ambient environment. Hence, the attenuation of light may be a measure of the property of the ambient environment. For example, the extent to which light having a specific wavelength is attenuated after propagation through/by the plasmonic sensing element 100 may be used to determine the property of the ambient environment. Further, changes in the ambient environment may affect which wavelength at which light is attenuated the most (typically referred to as the peak attenuation). By determining how the wavelengths of the peak attenuation varies, variations in the ambient environment (e.g., in the property of the ambient environment) may be determined. The shift of the peak attenuation may, e.g., be determined by determining the attenuation of light at a specific wavelength that may be different from the wavelength of peak attenuation. For example, the attenuation of light may be determined for light having a first wavelength, and as the wavelength of peak attenuation varies, the attenuation of light having the first wavelength may vary as well. Hence, by determining how the attenuation of light having the first wavelength, the wavelength of peak attenuation may be determined. In practice, the first light sensor 110 may measure efficiently at a range of wavelengths. The range of wavelengths may be a function of the properties of the optical components (e.g., the light sources, and/or the light sensors). The range of wavelengths may be tuned via inclusion of a bandpass filter. For example, a bandwidth of light emitted by the first light source 130 may be reduced by arranging the bandpass filter in between the first light source 130 and the plasmonic sensing element 100. Alternatively, or additionally, the bandpass filter may be arranged in between the plasmonic sensing element 100 and the first light sensor 110, thereby reducing the range of wavelengths of light that may reach the first light sensor 110. Thereby, the range of wavelengths can be chosen to most efficiently determine the wavelength of peak attenuation. Further, the shift of the peak attenuation may be determined by a spectrometer, i.e. the first light sensor 110 may be a spectrometer.

The first receive function 154 is further configured to receive S602 a first source signal from the second light sensor 120 pertaining to light emitted by the first light source 130. The first source signal may be a measure of an amount of light being emitted by the first light source 130. This since the second light sensor 120 may be illuminated by the first light source 130 via components that are configured not to specifically react to the ambient environment. Put differently, the intensity of light incident on the second light sensor 120 and emitted by the first light source 130 may mainly depend on the amount of light emitted by the first light source 130. Since the first and second light sensors 110, 120 may be illuminated by the first light source 130 at the first point in time, the measurement signal and the first source signal may be received at the first point in time.

The second receive function 156 is configured to receive S606, S616 a reference signal from the first light sensor 110 pertaining to light emitted by the second light source 140, and a second source signal from the second light sensor 120 pertaining to light emitted by the second light source 140. The reference signal may be a measure of an amount of light being emitted by the second light source 140. This since the first light sensor 110 may be illuminated by the second light source 140 via components that are configured not to specifically react to the ambient environment. Put differently, the intensity of light incident on the first light sensor 110 and emitted by the second light source 140 may be mainly dependent on the amount of light emitted by the second light source 140. This may also apply, mutatis mutandis, to the second source signal. Since the first and second light sensors 110, 120 may be illuminated by the second light source 140 at the second point in time, the reference and second source signals may be received at the second point in time.

The determination function 158 is configured to determine S618 the property of the ambient environment by comparing the measurement signal and the reference signal. The determination function 158 may be configured to determine an absolute measure of the property of the ambient environment, e.g. by using absolutely calibrated light sensors 110, 120. The determination function 158 may be configured to determine a relative measure of the property of the ambient environment, e.g. by comparing how the measure of the property changes over time. As is understood, the determination function 158 may be configured to compare the measurement signal associated with the first point in time with the reference signal associated with the second point in time. The property of the ambient environment may be a change in the ambient environment. Hence, the optical measurement device 10 may determine a change in the ambient environment. The determination function 158 may be further configured to output an output signal. The output signal may be a signal related to the property of the ambient environment determined by the determination function 158. The determination function 158 may be configured to determine the property of the ambient environment by being configured to determine a ratio of the measurement signal and the reference signal. It is to be understood that the determination function 158 may be configured to perform additional operations in order to determine the property of the ambient environment. For example, in case the optical measurement device 10 is configured to determine a refractive index of the ambient environment, the determination function 158 may be further configured to, e.g., compare the output signal with a database comprising refractive indices and signal values. In any case, the measurement signal and the reference signal may allow the determination function 158 to determine a signal (e.g. the output signal) which is a measure of the property of the ambient environment.

The control function 152 is further configured to control S608 the first light source 130 and the second light source 140, using the first source signal and the second source signal, such that a relation of the intensities of light emitted by the first light source 130 and the second light source 140 is constant over time. Hence, any external factors affecting the components of the optical measurement device 10 may be compensated for, and thereby allow the optical measurement device 10 to robustly determine the property of the ambient environment. Further, internal factors, such as unintentional long-term drifts of components, may also be compensated. For instance, in case the output of light from one of the light sources 130, 140 is reduced over time, this will be compensated for by the control function 152 since it is configured to use the first and second source signals. Such change over time may be counteracted by changing a drive current of the first and/or the second light source 140, such that the intensity of light emitted by the first and/or the second light source 140 is constant over time. Further, since the determination function 158 is configured to use the measurement signal and the reference signal, the effect of, e.g., drift of the first light sensor 110 on the determination of the property of the ambient environment, may be reduced.

The relation of the intensities of light emitted by the first light source 130 and the second light source 140 may be that the intensities are equal.

The control function 152 may be further configured to control the first light source 130 and the second light source 140 further using an external reference signal. The external reference signal may be provided by a reference source 160. The reference source 160 may be configured to provide a stable signal. In this context, by "stable signal" here is meant a signal that may be stable over time and/or for varying temperatures. The reference source 160 may be a reference voltage source or a reference current source. The external reference signal may be an external electrical signal. For instance, the control function 152 may compare the first source signal with the external reference signal, and adjust the first light source 130 such that a relation between the first source signal and the external reference signal is constant over time. Further, the control function 152 may compare the second source signal with the external reference signal, and adjust the second light source 140 such that a relation between the second source signal and the external reference signal is constant over time. By further using a reference signal, a drift of any or both of the light sources 130, 140 may be compensated for by the control function 152.

As is illustrated in FIG. 1, the optical measurement device 10 may further comprise a reference element 180 configured to, when illuminated with electromagnetic radiation, exhibit a reference plasmonic resonance condition being dependent on a refence material within the reference element 180, wherein the reference element 180 may be arranged such that the second light source 140 illuminates the first light sensor 110 via the reference element 180. The reference element 180 may comprise a layer deposited on a surface of the reference element 180. The layer may comprise material different than a material of the reference element 180. The deposited layer of the reference element 180 may, e.g., comprise a dielectric material. The reference element 180 may be configured to react to changes in the ambient environment other than the property of interest. For example, the deposited layer of the reference element 180 may be configured to react to changes in the ambient environment other than the property of interest. Put differently, the reference element 180 may be configured to react to other properties than the property of the ambient environment that the plasmonic sensing element 100 is specifically configured to react to. Put differently, the reference element 180 may be physically separated and/or shielded from the ambient environment to be measured but still influenced by the ambient environment in terms of, e.g., humidity, temperature, ambient light, etc. This may allow the optical measurement device 10 to further reduce influence of external factors other than the property of the ambient environment that is of interest.

Figure 3:
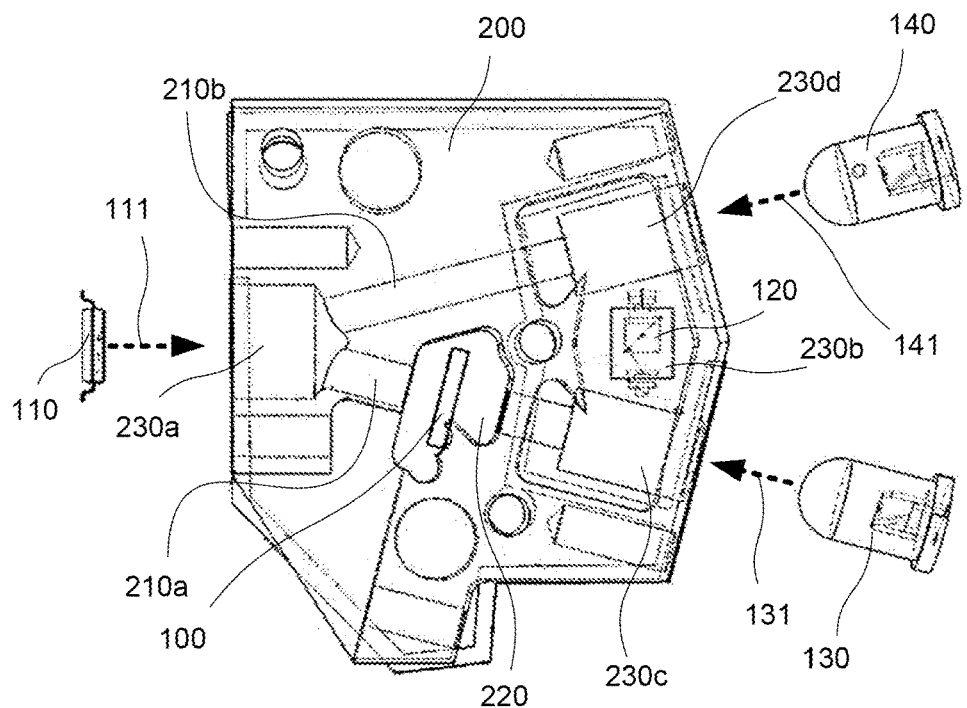
FIG. 3 illustrates an optical measurement device further comprising a housing.
Figure 12:
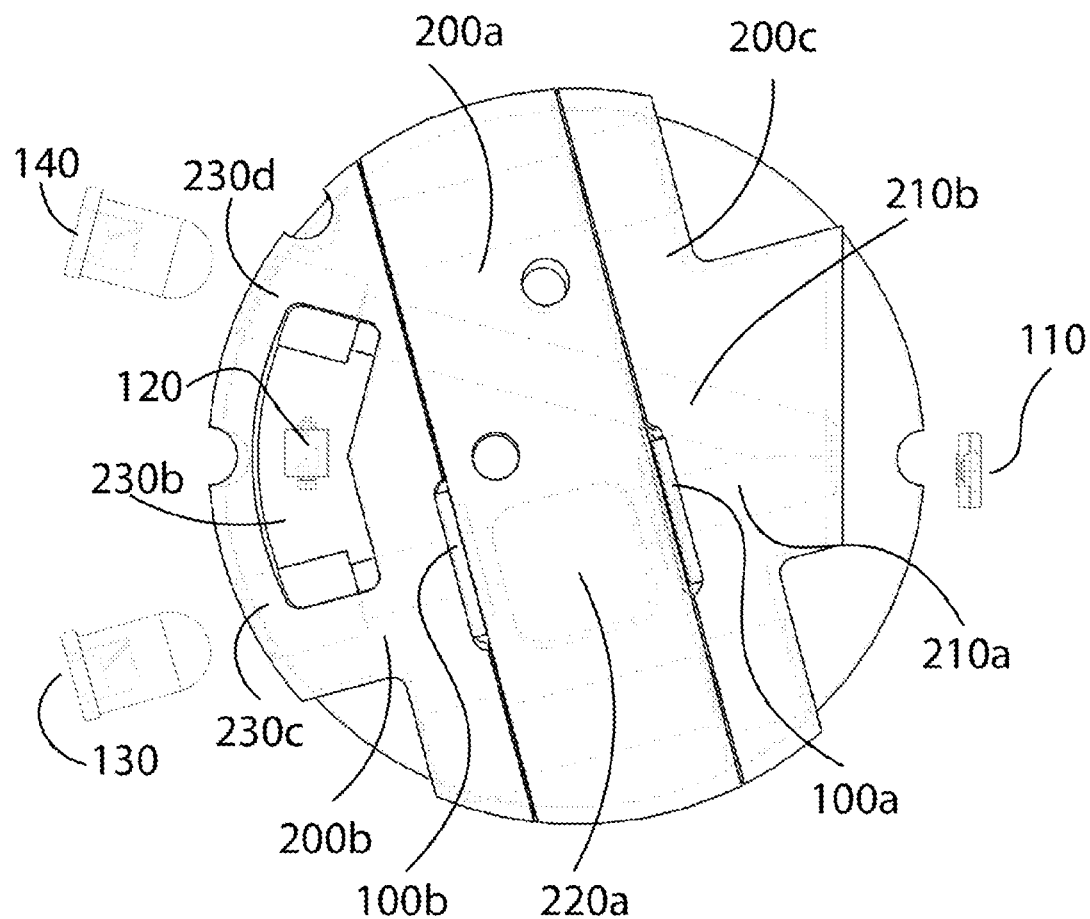

As is illustrated in the example of FIG. 3, the optical measurement device 10 may further comprise a housing 200 of an opaque material. The opaque material may, e.g., comprise a plastic and/or a metal. The material of the housing 200 may be opaque to light emitted by the first and second light sources 130, 140. The housing 200 may comprise channels 210 arranged to allow for optical communication between the first light source 130 and the first and second light sensors 110, 120, and between the second light source 140 and the first and second light sensors 110, 120. The housing 200 may comprise a through-put 220 allowing for the plasmonic sensing element 100 to communicate with the ambient environment. By comprising a housing 200, internal components of the optical measurement device 10 may be protected from debris. Further, internal components of the optical measurement device 10 may be protected from the ambient environment. The optical measurement device 10 of FIG. 3 is illustrated in a partly exploded view. The housing 200 may, as is illustrated in FIG. 3, comprise cavities 230. The cavities 230 may be arranged to receive the light sensors 110, 120 and the light sources 130, 140. More specifically, a first cavity 230a of the housing 200 is arranged to receive the first light sensor 110 (indicated by arrow 111), a third cavity 230c of the housing 200 is arranged to receive the first light source 130 (indicated by arrow 131), and a fourth cavity 230d is arranged to receive the second light source 140 (indicated by arrow 141). Further, as in the example illustrated in FIG. 3, the second light sensor 120 may be arranged in a second cavity 220b of the housing 200. Thus, in an assembled state, the light sensors 110, 120 and the light sources 130, 140 may be arranged in respective cavity 230. The housing 200 may configured such that only the plasmonic sensing element 100 is exposed to the ambient environment. For example, in an assembled state, the light sensors 110, 120 and the light sources 130, 140 may be arranged in respective cavity 230 and each respective cavity 230 may be hermetically sealed. For instance, a first channel 210a connecting the first cavity 230a and a position at which the plasmonic sensing element 100 is arranged, and a channel connecting the third cavity 230c and the position at which the plasmonic element 100 is arranged may each comprise optically transparent seals. The optically transparent seals may allow the light sensors 110, 120 and the light sources 130, 140 to be hermetically sealed from the ambient environment. For instance, the plasmonic sensing element 100 may be arranged to further function as one of the optically transparent seals. Hence, the plasmonic sensing element 100 may be arranged such that one major surface of the plasmonic sensing element 100 is in communication with the ambient environment and such that the other major surface of the plasmonic sensing element 100 is not in communication with the ambient environment. It is further contemplated that the other optically transparent seal may be a second plasmonic sensing element. Hence, the first light source 130 may be arranged to illuminate the first light sensor 110 via two plasmonic sensing elements. An example of such arrangement is illustrated in FIG. 12. The optical measurement device of FIG. 12 shares many similarities with the optical measurement device of FIG. 3. However, the optical measurement device of FIG. 12 comprises a first plasmonic sensing element 100a and a second plasmonic sensing element 100b arranged to seal the light sensors 110, 120 and the light sources 130, 140 from the ambient environment. Each of the first plasmonic sensing element 100a and the second plasmonic sensing element 100b is arranged such that one major surface is in communication with the ambient environment via through-put 220a, and such that the other major surface is hermetically sealed from the ambient environment.

Figure 4:
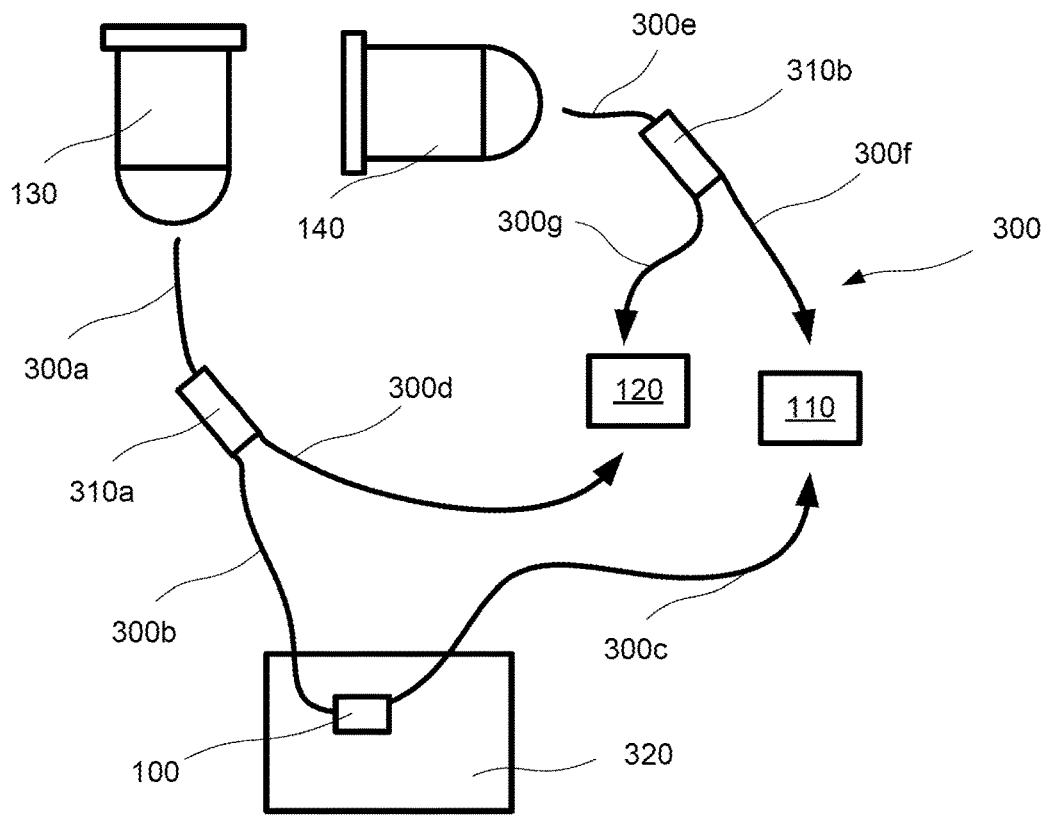
FIG. 4 illustrates an optical measurement device further comprising a plurality of optical fibers.
Figure 5:
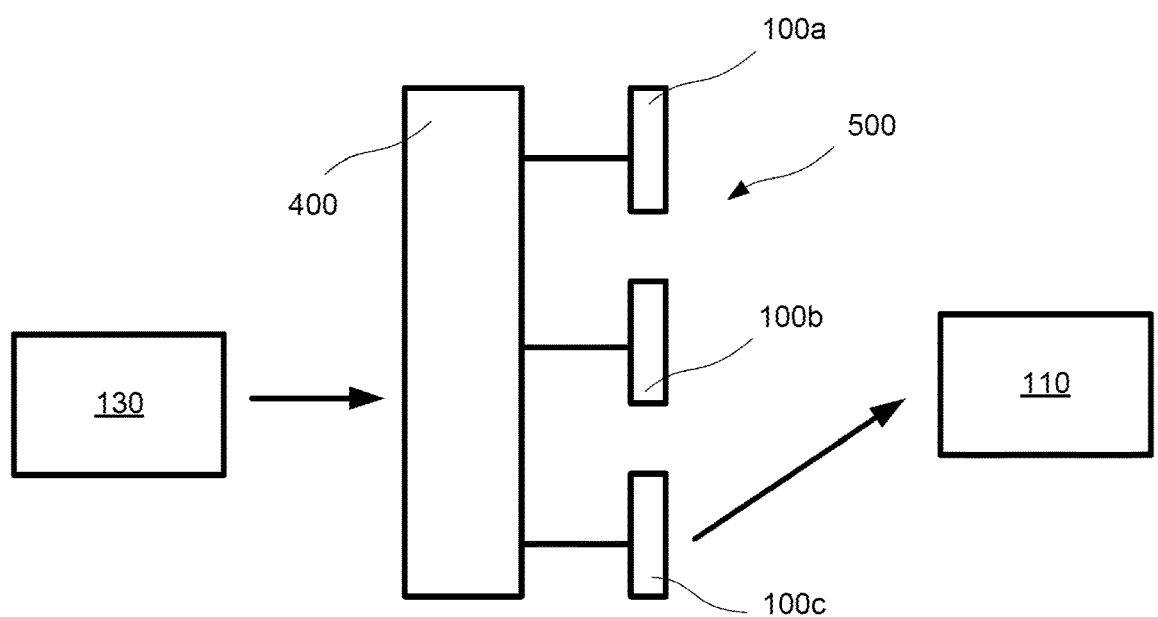
FIG. 5 illustrates an optical measurement device further comprising a plurality of plasmonic sensing elements and an optical switch.

As is illustrated in the example of FIG. 4, the optical measurement device 10 may further comprise a plurality 300 of optical fibers. The plurality 300 of optical fibers may be arranged to allow for optical communication between first light source 130 and the first and second light sensors 110, 120, and/or between the second light source 140 and the first and second light sensors 110, 120. In this way, components of the optical measurement device 10 may be positioned remotely from each other. For instance, the plasmonic sensing element 100 may be coupled to first light source 130 and the first light sensor 110 via optical fibers 300b, 300c, thereby allowing for the plasmonic sensing element 100 to be placed at a position not suitable for placing the optical measurement device 10. This may, e.g., be advantageous in case measurements are to be made in chemically harsh environments or in small spaces unable to accommodate the optical measurement device 10. As is illustrated in FIG. 4, the first light source 130 may be coupled to a first optical splitter 310a via a first optical fiber 300a. The first optical splitter 310a may further be coupled to the first light sensor 110 via the plasmonic sensing element 100 by a second and third optical fiber 300b, 300c. The first optical splitter 310a may further be coupled to the second light sensor 120 via a fourth optical fiber 300d. Similarly, the second light source may be coupled to a second optical splitter 310b via a fifth optical fiber 300e. The second optical splitter 310b may further be coupled to the first light sensor via a sixth optical fiber 300f and to the second light sensor via a seventh optical fiber. As is seen in FIG. 3, the plasmonic sensing element 100 may, e.g., be placed in a test cell 320.

The optical measurement device 10 may further comprise: a plurality 500 of plasmonic sensing elements. Said plasmonic sensing element 100 may be a plasmonic sensing element 100a, 100b, 100c of the plurality 500 of plasmonic sensing elements. The optical measurement device 10 may further comprise an optical switch 400 arranged to receive light from the first light source 130 and to illuminate the first light sensor 110 via at least one plasmonic sensing element 100a, 100b, 100c of the plurality 500 of plasmonic sensing elements. The circuitry 150 may be further configured to execute a switching function (not shown in the figures). The switching function may be configured to control the optical switch 400, thereby allowing the switching function to choose via which one, or which combination, of the plurality 500 of plasmonic sensing elements that the first light sensor 110 is illuminated by the first light source 130. In this way, the optical measurement device may be allowed to sample different portions of the ambient environment. Put differently, the optical measurement device 10 may be allowed to determine how the property of the ambient environment varies spatially. Further, each of the plurality 500 of plasmonic sensing elements may be configured to determine different properties of the ambient environment. By measuring different properties of the ambient environment, a more complete picture of the ambient environment may be determined. Each of the plurality 500 of plasmonic sensing elements may be arranged for optical communication with the first light sensor 110. For example, each of the plurality 500 of plasmonic sensing elements may be coupled to the first light sensor 110 using optical fibers. The optical measurement device 10 may further comprise an optical combiner (not shown in the figures) coupled to each of the plurality 500 of plasmonic sensing element and to the first light sensor 110. The optical combiner may be configured to combine light pertaining to each of the plurality 500 of plasmonic sensing elements and illuminate the first light sensor 110.

It is further envisioned that the optical switch 400 may be arranged to receive light from the plurality 500 of plasmonic sensing elements and to illuminate the first light sensor 110. Put differently, the first light source 130 may be arranged to illuminate all plasmonic sensing elements 100a, 100b, 100c of the plurality 500 of plasmonic sensing elements, and the optical switch 400 may be arranged to select (using e.g., the switching function) which one, or which combination, of the plasmonic sensing elements 100a, 100b, 100c of the plurality 500 of plasmonic sensing elements that the first light sensor 110 may be illuminated via.

Figure 7:
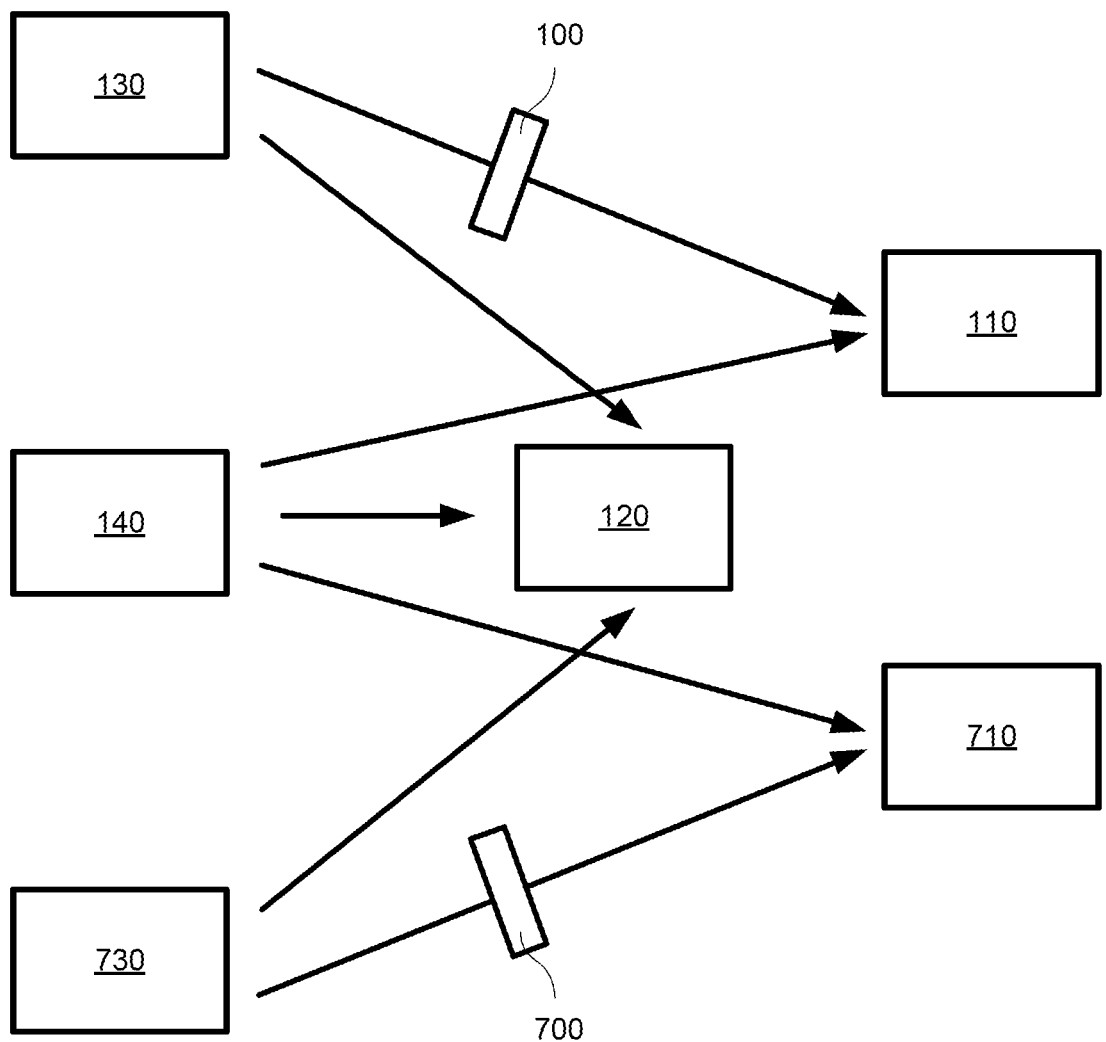
FIG. 7 illustrates an optical measurement device comprising a plasmonic sensing element and a further plasmonic sensing element.

As is illustrated in the example of FIG. 7, the optical measurement device 10 may further comprise a further plasmonic sensing element 700, a third light sensor 710, and a third light source 730. The third light source 730 may be a light emitting diode. The further plasmonic sensing element 700 may be configured to, when illuminated with electromagnetic radiation, exhibit a plasmonic resonance condition being dependent on a further property of the ambient environment. The third light source 730 may be arranged to simultaneously illuminate the second light sensor 120 and the third light sensor 710. The third light sensor 710 may be illuminated by the third light source 730 via the further plasmonic sensing element 700. The second light source 140 may be further arranged to simultaneously illuminate the second light sensor 120 and the third light sensor 710. The second light source 140 may be arranged to simultaneously illuminate the first light sensor 110, the second light sensor 120, and the third light sensor 710. The control function 152 may be further configured to control the second light source 140 and the third light source 730 to alternately illuminate the second and third light sensors 120, 710. The control function 152 may be configured to control the first light source 130, the second light source 140, and the third light source 730 such that the light sensors 110, 120, 710 are illuminated with light from one of the first light source 130, the second light source 140, and the third light source 730 at a single point in time. In other words, the control function 152 may be configured to control the light sources 130, 140, 730 to alternately illuminate the light sensors 110, 120, 710.

The circuitry 150 may be further configured to execute a further receive function (not shown in the figures). The further receive function may be configured to receive a further measurement signal from the third light sensor 710 pertaining to light emitted by the third light source 730, and a further source signal from the second light sensor 120 pertaining to light emitted by the third light source 730. The determination function 158 may be further configured to determine the further property of the ambient environment by comparing the further measurement signal and the reference signal. The control function 152 may be further configured to control the third light source 730, using the second source signal and the further source signal, such that a relation of the intensities of light emitted by the second light source 140 and the third light source 730 is constant over time.

The skilled person appreciates that the description of the first light sensor 110, the first light source 130, and the plasmonic sensing element 100, may apply to the third light sensor 710, the third light source 730, and the further plasmonic sensing element 700. Put differently, further comprising the third light sensor 710, the third light source 730, and the further plasmonic sensing element 700 may allow the optical measurement device 10 to determine both two different properties of the ambient environment. However, the further property determined using the further plasmonic sensing element 700 may be the same property determined using the plasmonic sensing element 100. In such case, information relating to how the determined property varies spatially may be determined by arranging the plasmonic sensing elements 100, 700 at different spatial positions.

The person skilled in the art realizes that the present inventive concept by no means is limited to the preferred variants described above. On the contrary, many modifications and variations are possible within the scope of the appended claims.

For example, the optical measurement device 10 has been separately described as having a housing 200 or optical fibers, however, it is to be understood that combinations between the two are possible. For instance, the channels in the housing 200 may comprise optical fibers allowing for optical communication between components of the optical measurement device 10.

It is further to be understood that portions of a function may be implemented as separate functions. For example, the portion of the control function 152 associated with controlling light sources 130, 140 and the portion of the control function 152 associated with, e.g., comparing signals may be implemented as separate functions. It is further to be understood that portions of a function may be executed on separate devices, the devices may be physically separated but coupled to each other.

As a further example, the optical measurement device 10 may further comprise one or more temperature sensors configured to determine temperatures of the optical measurement device 10 and the ambient environment. The control function 152 may be further configured to compensate its output by taking into account the readings of the one or more temperature sensors and a predetermined, or predicted, effect of temperature on the optical measurement device. Such a compensation may be implemented using a look-up table, and the look-up table may be formed during a calibration of the optical measurement device.

In FIG. 8A, FIG. 9A-FIG. 9C, FIG. 10A-FIG. 10C, and FIG. 11A-FIG. 11C, the vertical axes are labelled with "Signal level (arb. units)". This signal level should be construed as a relative signal level or a relative change of the signal. In particular, it may be a change of the signal relative to the signal at time 0 minutes in each respective figure.

Figure 8A:
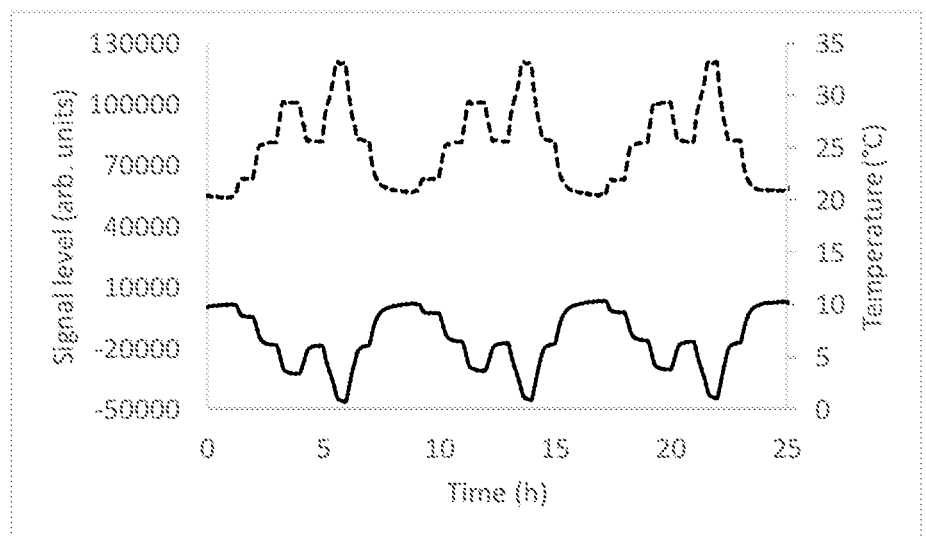
FIG. 8A illustrates a temperature and a relative signal over time.
Figure 8B:
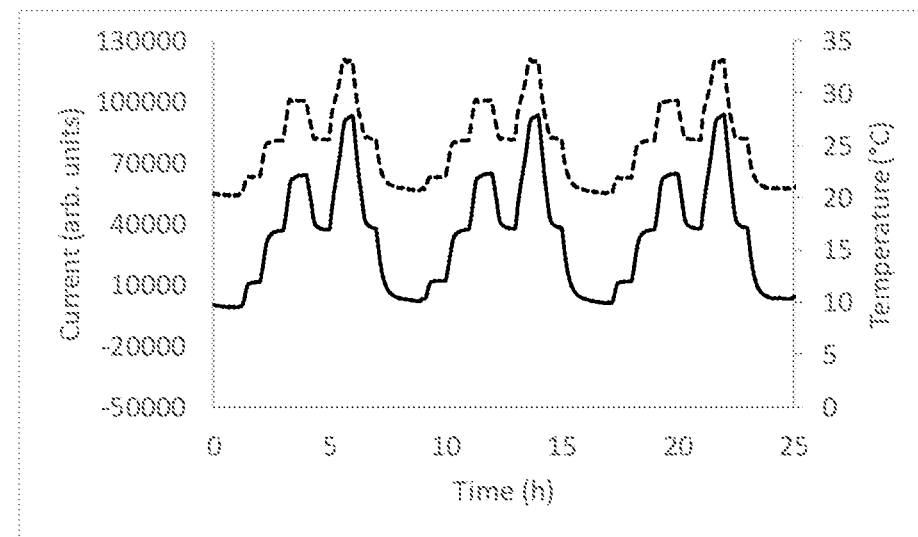
FIG. 8B illustrates the temperature and a control signal of the light sources over time.

In the example illustrated in FIG. 8A-FIG. 8B, the ambient temperature, i.e. the temperature of the atmosphere around the optical measurement device 10, is controlled over time. FIG. 8A illustrates ambient temperature (represented by a dashed line) and a relative signal (represented by a solid line) over time. The relative signal in the example of FIG. 8A is a ratio between the measurement signal from the first light sensor 110 and the reference signal from the first light sensor 110. The measurement signal pertains to light emitted by the first light source 130 and received at the first light sensor via the plasmonic sensing device 100. The reference signal pertains to light emitted by the second light source 140. As is seen in the example of FIG. 8A, the relative signal depends on the ambient temperature. However, this dependence has been reduced in the example of FIG. 8A by controlling the first light source 130 and the second light source 140 using a driving current which is illustrated in FIG. 8B. A skilled person would be aware of how the driving current of FIG. 8B of the light sources 130, 140 may be determined based on the first and second source signals such that the intensities of light from the light sources 130, 140 on the second light sensor 140 are substantially constant, e.g. by using a feedback loop. In FIG. 8B, the ambient temperature is represented by a dashed line and the driving current is represented by a solid line. The driving current may be a current driving the first light source 130 and/or the second light source 140. It should be noted that the temperature dependence on the signals is an example only, and similar behavior may be seen, and compensated for, for variance in relative humidity and pressure as well, which will be discussed in connection with FIG. 9A-FIG. 9C, FIG. 10A-FIG. 10C, and FIG. 11A-FIG. 11C.

Figure 9A:
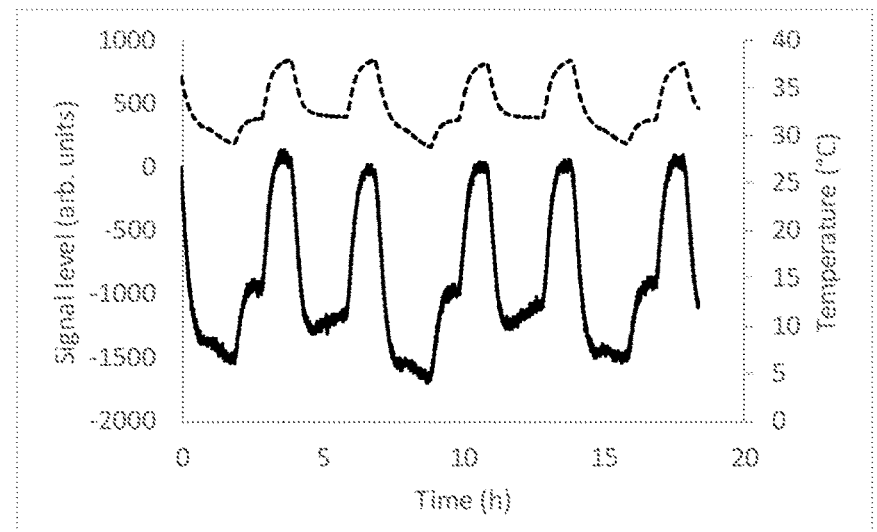
FIG. 9A illustrates ambient temperature and a measurement signal as functions of time.
Figure 9B:
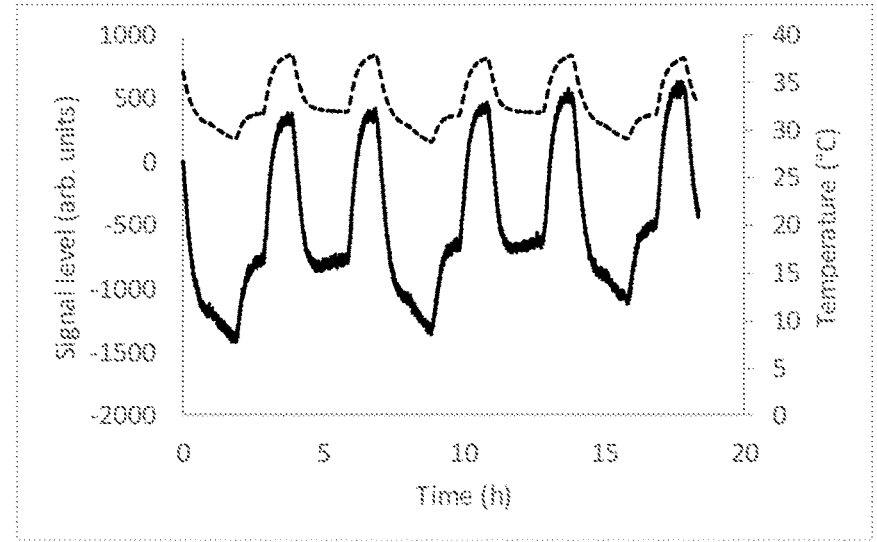
FIG. 9B illustrates ambient temperature and a reference signal as functions of time.
Figure 9C:
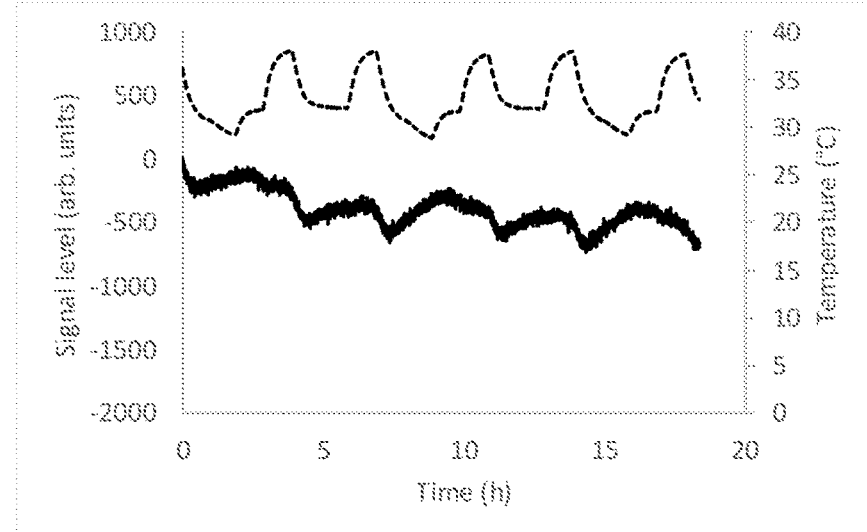
FIG. 9C illustrates ambient temperature, and a ratio between the measurement signal of FIG. 9A and the reference signal of FIG. 9B as functions of time.

In the example illustrated in FIG. 9A-FIG. 9C, the ambient temperature, i.e. the temperature of the atmosphere around the optical measurement device 10, is controlled over time. In FIG. 9A, the ambient temperature (represented by a dashed line) and the measurement signal (represented by a solid line) from the first light sensor 110 are illustrated as functions of time. In the example of FIG. 9A, the plasmonic sensing element 100 of the optical measurement device 10 has been removed. Hence, the measurement signal in FIG. 9A pertains to the intensity of light emitted by the first light source 130. As is clearly visible, the intensity of light emitted by the first light source 130 is sensitive to the ambient temperature. In FIG. 9B, the ambient temperature (represented by a dashed line) and the reference signal (represented by a solid line) from the first light sensor 110 are illustrated as functions of time. The reference signal in FIG. 9B pertains to the intensity of light emitted by the second light source 140. Similar to the intensity of light emitted by the first light source 130 (as illustrated in FIG. 9A), the intensity of light emitted by the second light source 140 is sensitive to the ambient temperature. However, since the intensities of the first light source 130 and the second light source 140 are controlled such that the intensities are constant on the second light sensor 120, the temperature dependence of the signals have been reduced. FIG. 9C illustrates a ratio (represented by a solid line) of the measurement signal of FIG. 9A and the reference signal of FIG. 9B and the ambient temperature (represented by a dashed line) as functions of time. As is seen in FIG. 9C, the ratio between the measurement signal and the reference signal may be less sensitive to the ambient temperature than the measurement signal and the reference signal.

Figure 10A:
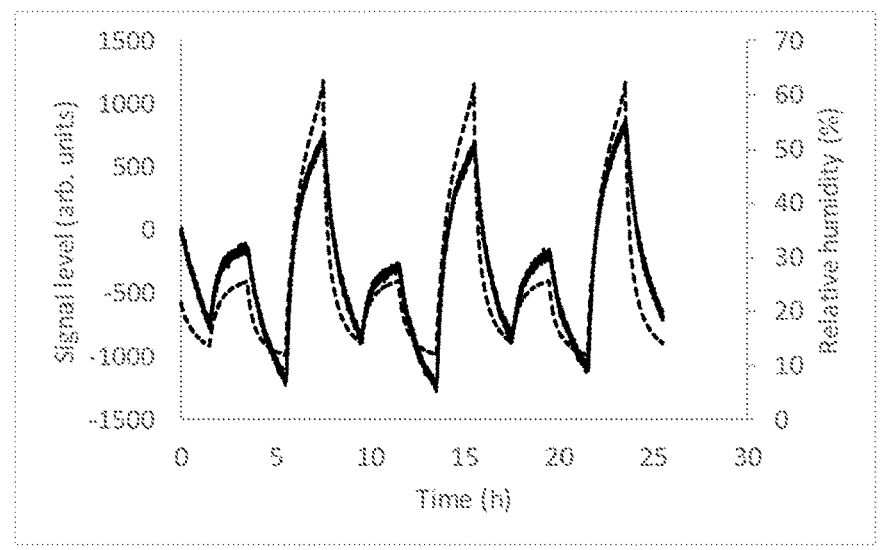
FIG. 10A illustrates relative humidity and a measurement signal as functions of time.
Figure 10B:
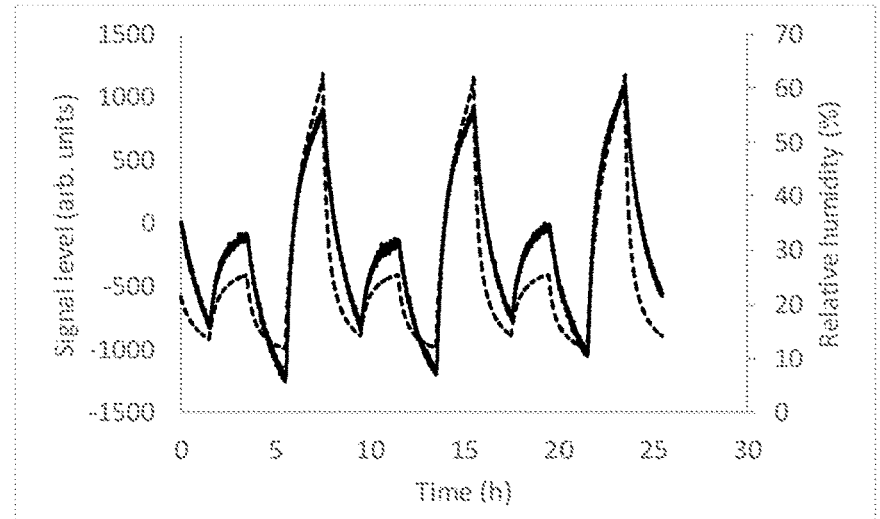
FIG. 10B illustrates relative humidity and a reference signal as functions of time.
Figure 10C:
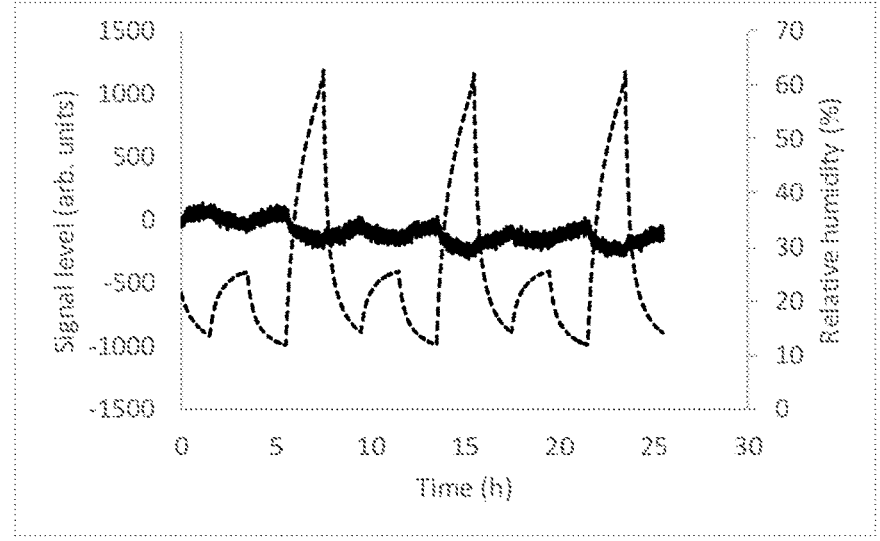
FIG. 10C illustrates relative humidity, and a ratio between the measurement signal of FIG. 10A and the reference signal of FIG. 10B as functions of time.

In the example illustrated in FIG. 10A-FIG. 10C, the relative humidity, i.e. the relative humidity of the atmosphere around the optical measurement device 10, is controlled over time. In FIG. 10A, the relative humidity (represented by a dashed line) and the measurement signal (represented by a solid line) from the first light sensor 110 are illustrated as functions of time. In the example of FIG. 10A, the plasmonic sensing element 100 of the optical measurement device 10 has been removed. Hence, the measurement signal in FIG. 10A pertains to the intensity of light emitted by the first light source 130. As is clearly visible, the intensity of light emitted by the first light source 130 is sensitive to the relative humidity. In FIG. 10B, the relative humidity (represented by a dashed line) and the reference signal (represented by a solid line) from the first light sensor 110 are illustrated as functions of time. The reference signal in FIG. 10B pertains to the intensity of light emitted by the second light source 140. Similar to the intensity of light emitted by the first light source 130 (as illustrated in FIG. 10A), the intensity of light emitted by the second light source 140 is sensitive to the relative humidity. However, since the intensities of the first light source 130 and the second light source 140 are controlled such that the intensities are constant on the second light sensor 120, the dependence on relative humidity of the signals have been reduced. FIG. 10C illustrates a ratio (represented by a solid line) of the measurement signal of FIG. 10A and the reference signal of FIG. 10B and the relative humidity (represented by a dashed line) as functions of time. As is seen in FIG. 10C, the ratio between the measurement signal and the reference signal may be less sensitive to the relative humidity.

Figure 11A:
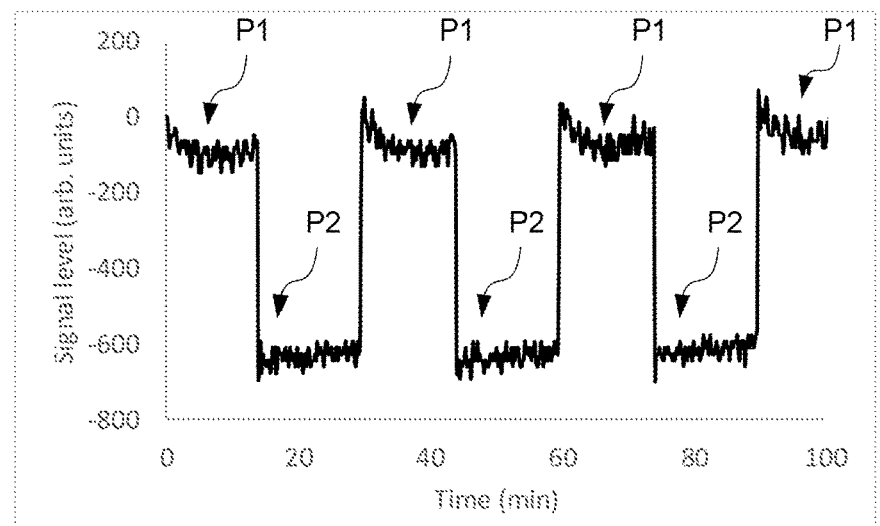
FIG. 11A illustrates a measurement signal as a function of time recorded at two different ambient pressures.
Figure 11B:
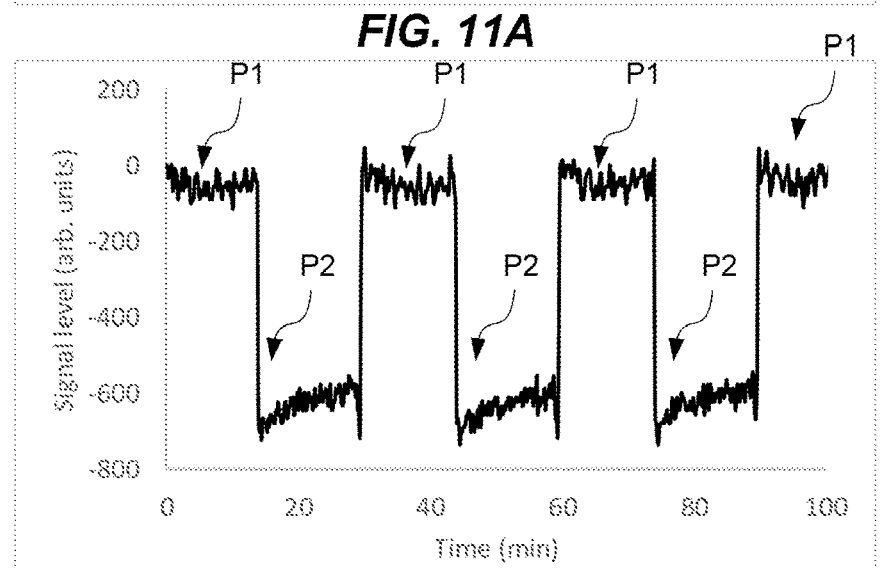
FIG. 11B illustrates a reference signal as a function of time recorded at two different ambient pressures.
Figure 11C:
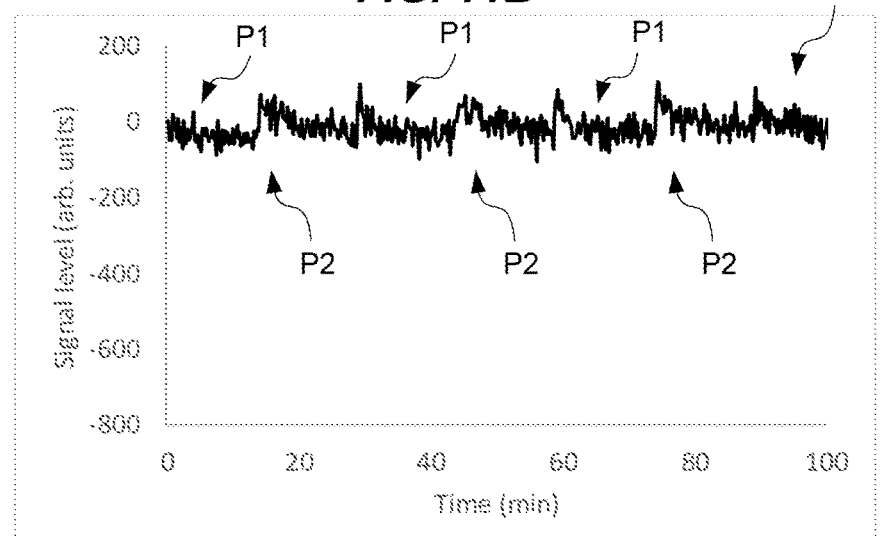
FIG. 11C illustrates a ratio between the measurement signal of FIG. 11A and the reference signal of FIG. 11B as a function of time.

In the example illustrated in FIG. 11A-FIG. 11C, the ambient pressure, i.e. the pressure of the atmosphere around the optical measurement device 10, is controlled over time. The ambient pressure is controlled over time between a first pressure P1 and a second P2. The first pressure P1 is 1 atm (approximately 1.0 bar, or 100 kPa) and the second pressure P2 is 0.25 atm (approximately 0.25 bar, or 25 kPa). In the example of FIG. 11A-FIG. 11C, the ambient pressure is controlled to be at the first pressure P1 from 0 to about 15 minutes, from about 30 minutes to about 45 minutes, from about 60 minutes to about 75 minutes, and from about 90 minutes to 100 minutes. In the example of FIG. 11A-FIG. 11C, the ambient pressure is controlled to be at the second pressure P2 from about 15 to about 30 minutes, from about 45 minutes to about 60 minutes, and from about 75 minutes to about 90 minutes. In FIG. 11A, the measurement signal (represented by a solid line) from the first light sensor 110 is illustrated as a function of time. In the example of FIG. 11A, the plasmonic sensing element 100 of the optical measurement device 10 has been removed. Hence, the measurement signal in FIG. 11A pertains to the intensity of light emitted by the first light source 130. As is clearly visible, the intensity of light emitted by the first light source 130 is sensitive to the ambient pressure. In FIG. 11B, the reference signal (represented by a solid line) from the first light sensor 110 is illustrated as a function of time. The reference signal in FIG. 11B pertains to the intensity of light emitted by the second light source 140. Similar to the intensity of light emitted by the first light source 130 (as illustrated in FIG. 11A), the intensity of light emitted by the second light source 140 is sensitive to the ambient pressure. However, since the intensities of the first light source 130 and the second light source 140 are controlled such that the intensities are constant on the second light sensor 120, the dependence on ambient pressure of the signals have been reduced. FIG. 11C illustrates a ratio (represented by a solid line) of the measurement signal of FIG. 11A and the reference signal of FIG. 11B as a function of time. As is seen in FIG. 11C, the ratio between the measurement signal and the reference signal may be less sensitive to the ambient pressure.

Hence, in view of the above results, controlling the first light source 110 and the second light source 120 according to the present inventive concept may reduce the influence of ambient temperature, relative humidity, and/or ambient pressure on the ratio of the measurement signal and the reference signal.

Additionally, variations to the disclosed variants can be understood and effected by the skilled person in practicing the claimed invention, from a study of the drawings, the disclosure, and the appended claims.

The invention claimed is:

1. An optical measurement device for determining a property of an ambient environment comprising:
    a plasmonic sensing element configured to, when illuminated with electromagnetic radiation, exhibit a plasmonic resonance condition being dependent on the property of the ambient environment, wherein the plasmonic resonance condition is a localized surface plasmon resonance condition;
    a first light sensor;
    a second light sensor;
    a first light source arranged to simultaneously illuminate the first light sensor and the second light sensor, wherein the first light sensor is illuminated by the first light source via the plasmonic sensing element;
    a second light source arranged to simultaneously illuminate the first light sensor and the second light sensor, wherein the first light sensor is not illuminated by the second light source via the plasmonic sensing element; and
    circuitry configured to execute:
    a control function configured to control the first light source (130) and the second light source to alternately illuminate the first and second light sensors,
    a first receive function configured to receive a measurement signal from the first light sensor pertaining to light emitted by the first light source, and a first source signal from the second light sensor pertaining to light emitted by the first light source,
    a second receive function configured to receive a reference signal from the first light sensor pertaining to light emitted by the second light source, and a second source signal from the second light sensor pertaining to light emitted by the second light source, and
    a determination function configured to determine the property of the ambient environment by comparing the measurement signal and the reference signal, and
    the control function being further configured to control the first light source and the second light source, using the first source signal and the second source signal, such that a relation of the intensities of light emitted by the first light source and the second light source is constant over time.

2. The optical measurement device according to claim 1, wherein the control function is configured to control the first light source and the second light source to alternately illuminate the first and second light sensors at a frequency of ≥0.5 Hz.

3. The optical measurement device according to claim 1, wherein the determination function is configured to determine the property of the ambient environment by being configured to determine a ratio of the measurement signal and the reference signal.

4. The optical measurement device according to claim 1, wherein the relation of the intensities of light emitted by the first light source and the second light source is that the intensities are equal.

5. The optical measurement device according to claim 1, further comprising:
   a housing of an opaque material; and
   wherein the housing comprises channels arranged to allow for optical communication between the first light source and the first and second light sensors, and between the second light source and the first and second light sensors.

6. The optical measurement device according to claim 1, further comprising:
   a plurality of optical fibers; and
   wherein the plurality of optical fibers is arranged to allow for optical communication between first light source and the first and second light sensors, and/or between the second light source and the first and second light sensors.

7. The optical measurement device according to claim 1, further comprising:
   a further plasmonic sensing element configured to, when illuminated with electromagnetic radiation, exhibit a plasmonic resonance condition being dependent on a further property of the ambient environment;
   a third light sensor; and
   a third light source arranged to simultaneously illuminate the second light sensor and the third light sensor, wherein the third light sensor is illuminated by the third light source via the further plasmonic sensing element;
   wherein the second light source is further arranged to simultaneously illuminate the second light sensor and the third light sensor;
   wherein the control function is further configured to control the second light source and the third light source to alternately illuminate the second and third light sensors;
   wherein the circuitry is further configured to execute a further receive function configured to receive a further measurement signal from the third light sensor pertaining to light emitted by the third light source, and a further source signal from the second light sensor pertaining to light emitted by the third light source;
   wherein the determination function is further configured to determine the further property of the ambient environment by comparing the further measurement signal and the reference signal; and
   wherein the control function is further configured to control the third light source, using the second source signal and the further source signal, such that a relation of the intensities of light emitted by the second light source and the third light source is constant over time.

8. The optical measurement device according to claim 1, further comprising:
   a plurality of plasmonic sensing elements, wherein said plasmonic sensing element (100) is a plasmonic sensing element of the plurality of plasmonic sensing elements; and
   an optical switch arranged to receive light from the first light source and to illuminate the first light sensor via at least one plasmonic sensing element of the plurality of plasmonic sensing elements.

9. The optical measurement device according to claim 1, wherein the first light source and/or the second light source is a light emitting diode.

10. The optical measurement device according to claim 7, wherein the third light source is a light emitting diode.

11. A method for determining a property of an ambient environment, the method comprising:
   illuminating, by a first light source, a second light sensor;
   receiving, from the second light sensor, a first source signal pertaining to light emitted from the first light source;
   illuminating, by a second light source, the second light sensor;
   receiving, from the second light sensor, a second source signal pertaining to light emitted from the second light source from the second light sensor;
   controlling the first light source and the second light source using the first source signal and the second source signal such that a relation of intensities of light emitted by the first light source and the second light source is constant over time;
   illuminating, by the first light source, the first light sensor via a plasmonic sensing element, wherein the plasmonic sensing element, when illuminated with electromagnetic radiation, exhibits a plasmonic resonance condition being dependent on the property of the ambient environment, wherein the plasmonic resonance condition is a localized surface plasmon resonance condition;
   receiving, from the first light sensor, a measurement signal pertaining to light emitted from the first light source;
   illuminating, by the second light source, the first light sensor, wherein the first light sensor is not illuminated by the second light source via the plasmonic sensing element;
   receiving, from the first light sensor, a reference signal pertaining to light emitted from the second light source; and
   determining the property of the ambient environment by comparing the measurement signal and the reference signal.

12. The method according to claim 11, wherein the first light source illuminates the first light sensor and the second light sensor simultaneously and/or the second light source illuminates the first light sensor and the second light sensor simultaneously.

13. The method according to claim 11, wherein the first light source and the second light source alternately illuminates the first light sensor and/or the second light sensor.

14. The method according to claim 13, wherein the first light source and the second light source alternately illuminates the first light sensor and/or the second light sensor at a frequency ≥0.5 Hz.

15. The method according to claim 14, wherein one of the measurement signal and the reference signal is received at a first point in time, and the other of the measurement signal and the reference signal is received at a second point in time, wherein the first point in time and the second point in time are separated by a time period based on the frequency at which the first light source and the second light source alternately illuminates the first light sensor and/or the second light sensor.

16. A non-transitory computer-readable storage medium comprising program code portions which, when executed on a device having processing capabilities, performs the method according to claim 11.

\* \* \* \* \*